United States Patent
Han et al.

(10) Patent No.: US 10,158,270 B2
(45) Date of Patent: Dec. 18, 2018

(54) VARIABLE POWER TRANSMISSION DEVICE

(71) Applicants: Seungjoo Han, Busan (KR); Byungho Han, Busan (KR); Jongtaek Han, Busan (KR)

(72) Inventors: Seungjoo Han, Busan (KR); Byungho Han, Busan (KR); Jongtaek Han, Busan (KR)

( * ) Notice: Subject to any disclaimer, the term of this patent is extended or adjusted under 35 U.S.C. 154(b) by 0 days.

(21) Appl. No.: 15/315,024

(22) PCT Filed: Jul. 3, 2015

(86) PCT No.: PCT/KR2015/006883
§ 371 (c)(1),
(2) Date: Nov. 30, 2016

(87) PCT Pub. No.: WO2016/006877
PCT Pub. Date: Jan. 14, 2016

(65) Prior Publication Data
US 2017/0201156 A1    Jul. 13, 2017

(30) Foreign Application Priority Data
Jul. 5, 2014 (KR) ......................... 10-2014-0084100

(51) Int. Cl.
*H02K 7/18*        (2006.01)
*F04D 17/10*       (2006.01)
(Continued)

(52) U.S. Cl.
CPC .......... *H02K 7/1815* (2013.01); *F04D 17/10* (2013.01); *F04D 25/02* (2013.01); *F04D 25/06* (2013.01);
(Continued)

(58) Field of Classification Search
USPC ................... 290/1 R; 192/48.1, 70.11, 85.39
See application file for complete search history.

(56) References Cited

U.S. PATENT DOCUMENTS 5,714,820 A * 2/1998 Mitsuhashi .......... H02K 49/065
                                                192/84.3
7,567,006 B2 * 7/2009 Ichiyama ............. H02K 21/028
                                                310/156.48
(Continued)

FOREIGN PATENT DOCUMENTS

JP     05-168222 A    7/1993
JP     10-094241 A    4/1998
(Continued)

*Primary Examiner* — Pedro J Cuevas
(74) *Attorney, Agent, or Firm* — Patent Office of Dr. Chung Park

(57) ABSTRACT

The present invention relates to a variable power transmission device which comprises: a power generator, a front driver module and a rear driver module; a power generator and any one selected from the front driver module and the rear driver module; or a power generator. The variable power transmission device produces a rotational force from a combination of: an induced magnetic field generated by the front driver module; a rotating magnetic field generated by the front driver module and the power generator; a rotating magnetic field generated by the power generator and the rear driver module; and an induced magnetic field generated by the power generator together with the rear driver module, using the power supplied from a power applying driving body or the power supplied from a power receiving driving body, increases the rotational force through acceleration, and transmits the power to the power receiving driving body.

12 Claims, 20 Drawing Sheets

(51) Int. Cl.
*F04D 25/02* (2006.01)
*F04D 25/06* (2006.01)
*F16C 37/00* (2006.01)
*F16H 57/021* (2012.01)
*F16H 57/028* (2012.01)

(52) U.S. Cl.
CPC ......... *F16C 37/005* (2013.01); *F16H 57/021* (2013.01); *F16H 57/028* (2013.01); *F16C 2380/26* (2013.01)

(56) References Cited

U.S. PATENT DOCUMENTS

| | | | | |
|---|---|---|---|---|
| 7,677,376 | B2* | 3/2010 | Schachtl | F16D 27/004 192/84.31 |
| 8,235,196 | B2* | 8/2012 | Kato | F16D 27/105 192/82 T |
| 8,242,652 | B2* | 8/2012 | Genster | H02K 49/065 310/106 |
| 8,479,851 | B2* | 7/2013 | MacK | H02K 7/003 180/65.1 |
| 8,602,940 | B2* | 12/2013 | Kuwahara | B60K 6/387 477/86 |
| 8,747,279 | B2* | 6/2014 | Furuichi | F16D 25/044 477/5 |
| 9,051,976 | B2* | 6/2015 | Kuwahara | B60K 6/40 |
| 9,062,721 | B2* | 6/2015 | Akahane | F16D 13/72 |
| 9,124,149 | B2* | 9/2015 | Shibata | F16H 57/029 |
| 9,322,362 | B2* | 4/2016 | Lim | F02B 37/04 |
| 9,874,254 | B2* | 1/2018 | Bleeker | F16D 63/002 |
| 10,008,916 | B2* | 6/2018 | Holcomb | H02K 53/00 |
| 10,038,349 | B2* | 7/2018 | Long | H02K 21/24 |
| 2007/0213161 | A1* | 9/2007 | Tabata | B60K 6/26 475/5 |
| 2009/0000896 | A1* | 1/2009 | Knowles | B60K 6/387 192/48.1 |
| 2009/0026864 | A1* | 1/2009 | Ichiyama | H02K 21/028 310/154.28 |
| 2009/0314600 | A1* | 12/2009 | Kato | F16D 27/105 192/84.31 |
| 2011/0259698 | A1* | 10/2011 | Arnold | B60K 6/36 192/48.1 |
| 2013/0059695 | A1* | 3/2013 | Kuwahara | B60K 6/387 477/86 |
| 2013/0062980 | A1* | 3/2013 | Kuwahara | B60K 6/40 310/78 |
| 2013/0168197 | A1* | 7/2013 | Furuichi | F16D 25/044 192/85.39 |
| 2014/0125208 | A1* | 5/2014 | Yamashita | F02C 6/12 310/68 B |
| 2014/0238016 | A1* | 8/2014 | Lim | F02B 37/04 60/599 |
| 2014/0332336 | A1* | 11/2014 | Akahane | F16D 13/72 192/70.11 |
| 2015/0033889 | A1* | 2/2015 | Shibata | F16H 57/029 74/421 A |
| 2015/0361870 | A1* | 12/2015 | Han | F04D 25/0653 417/423.12 |
| 2016/0009185 | A1* | 1/2016 | Sonoda | B60K 6/485 701/22 |
| 2016/0233755 | A1* | 8/2016 | Bayrakdar | H02K 53/00 |
| 2017/0201169 | A1* | 7/2017 | Han | H02K 49/108 |
| 2017/0222537 | A1* | 8/2017 | Xu | H02K 49/02 |
| 2018/0048254 | A1* | 2/2018 | McDonald | H02K 21/024 |
| 2018/0205089 | A1* | 7/2018 | Unnikrishnan | H01M 4/0404 |

FOREIGN PATENT DOCUMENTS

KR 10-2009-0126459 A 12/2009
KR 10-2011-0072635 A 6/2011

* cited by examiner

[FIG. 1]
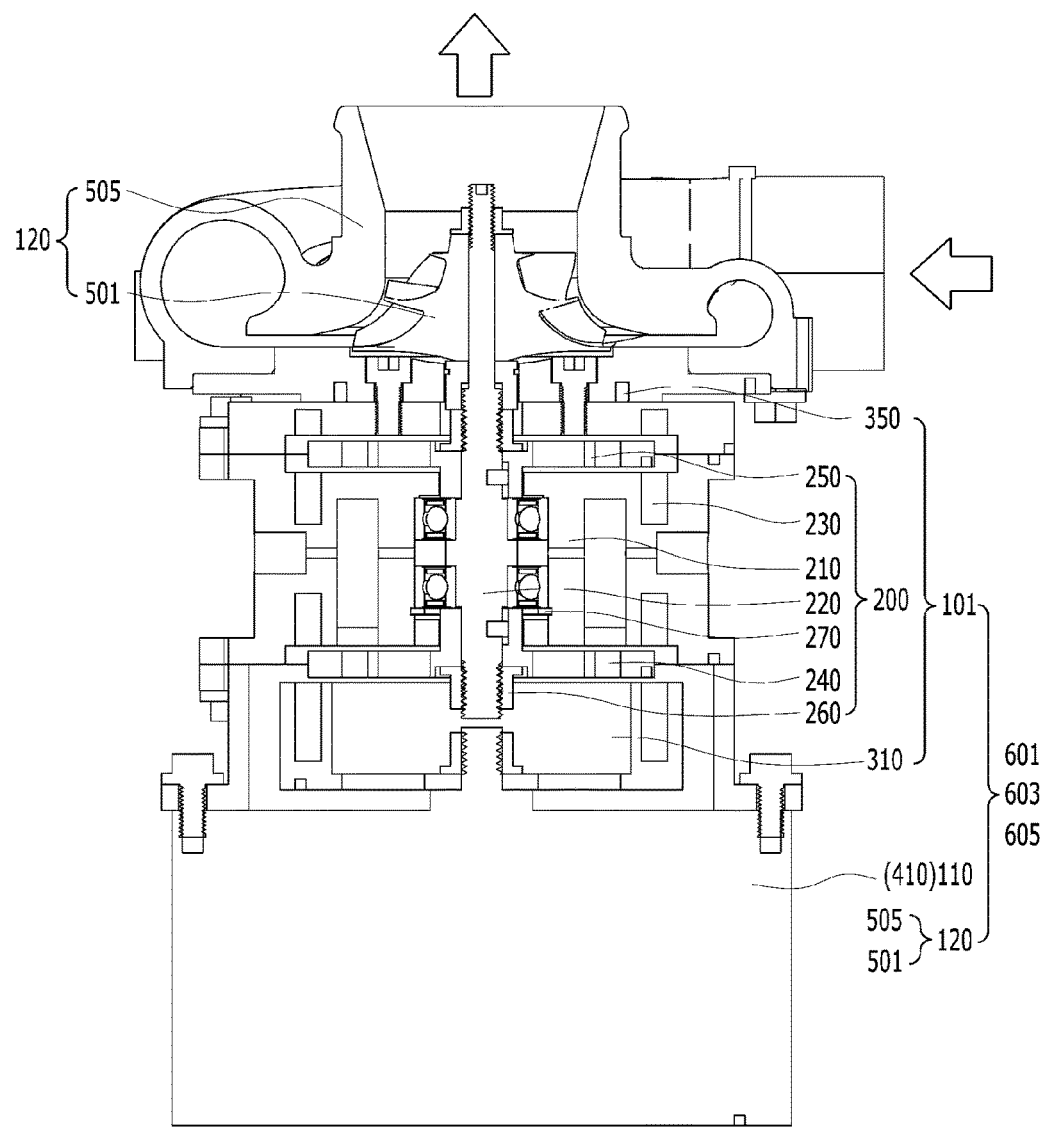

[FIG. 2]
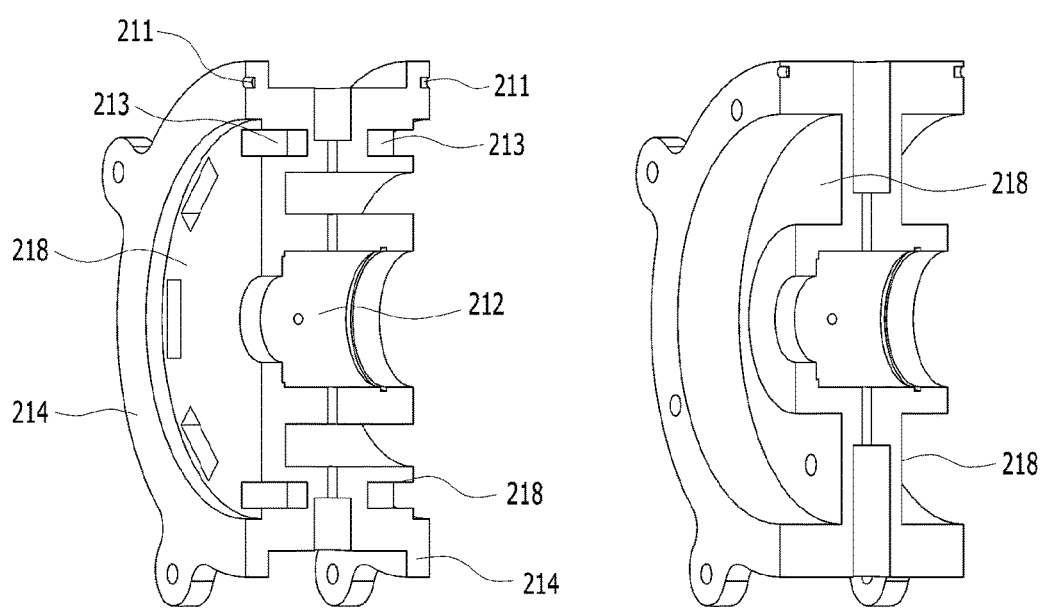

[FIG. 3]
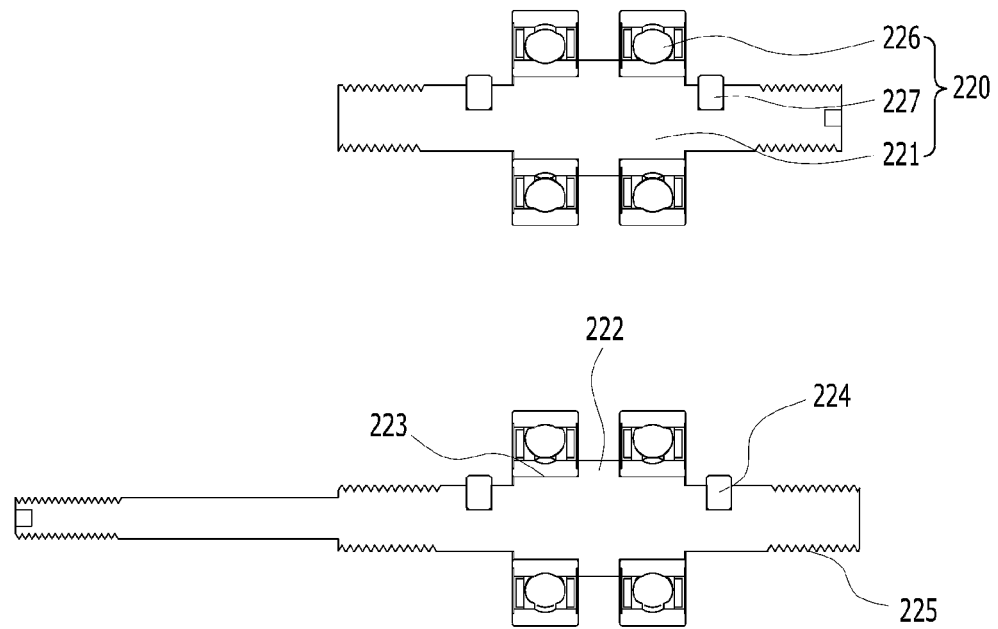

[FIG. 4]
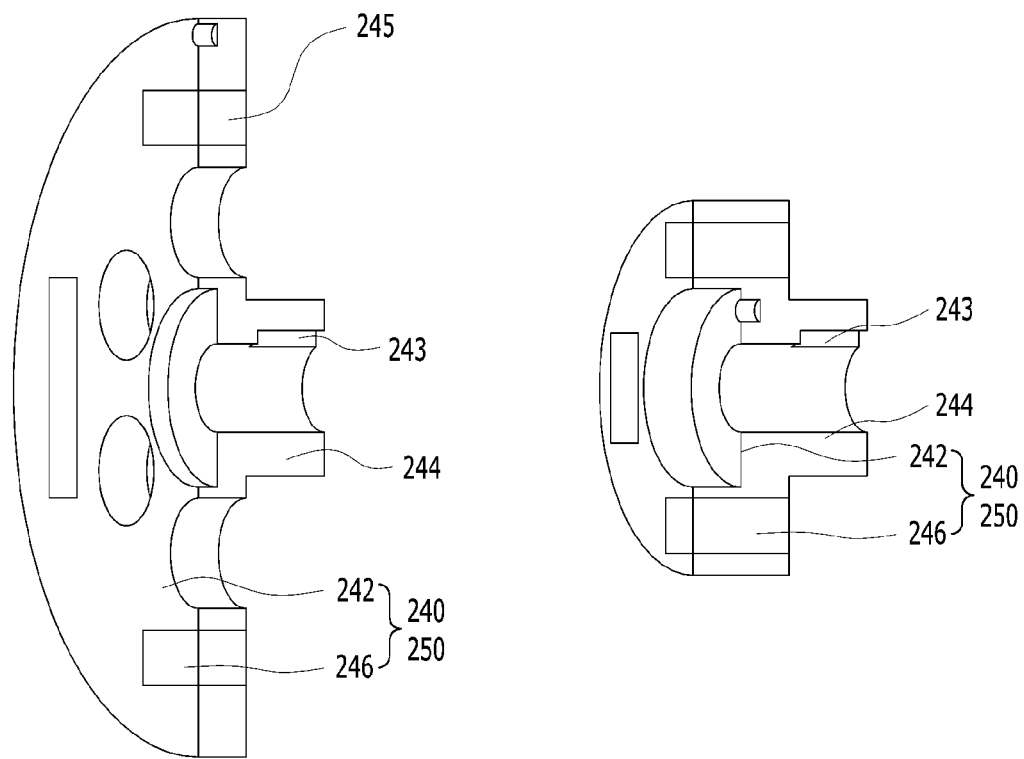

[FIG.5]
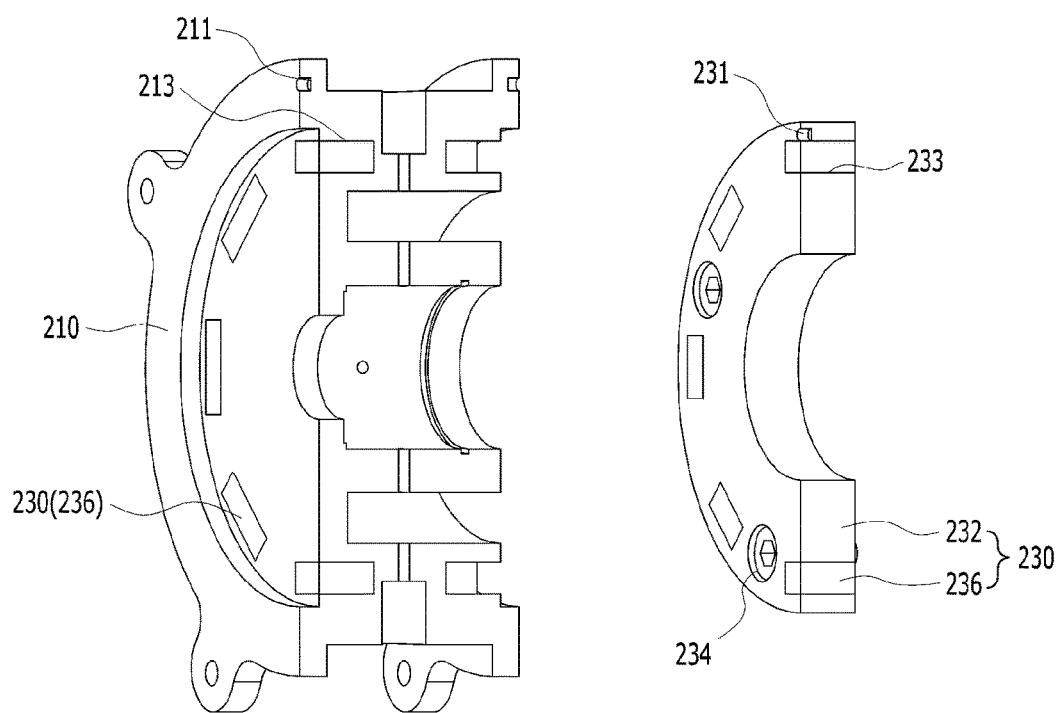

[FIG. 6]
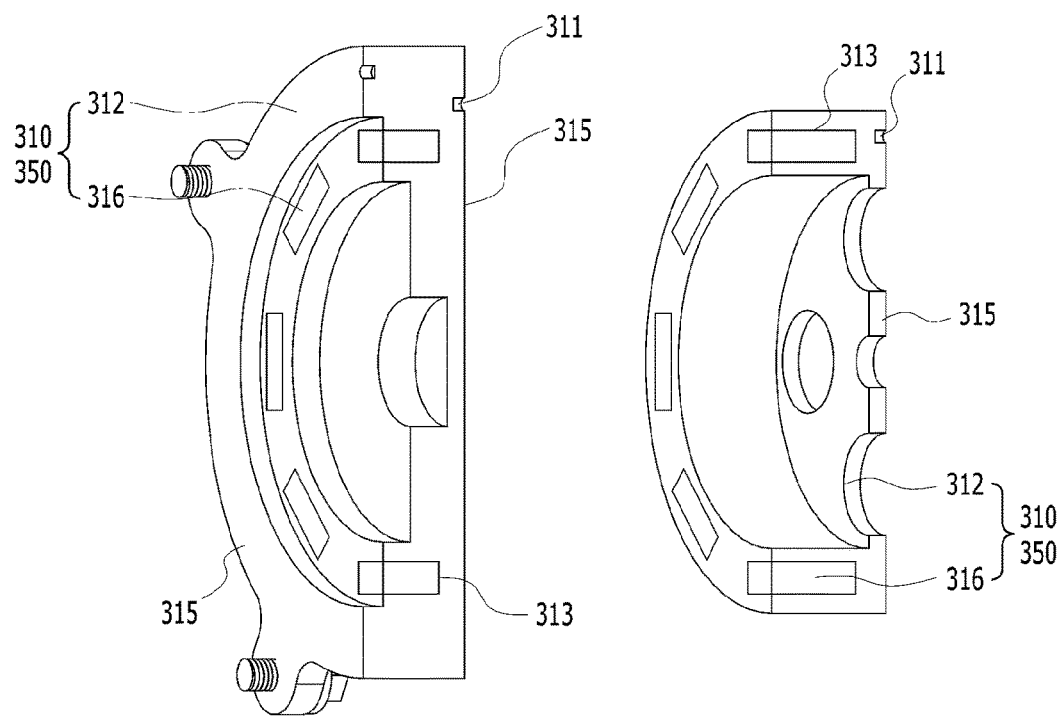

[FIG. 7]
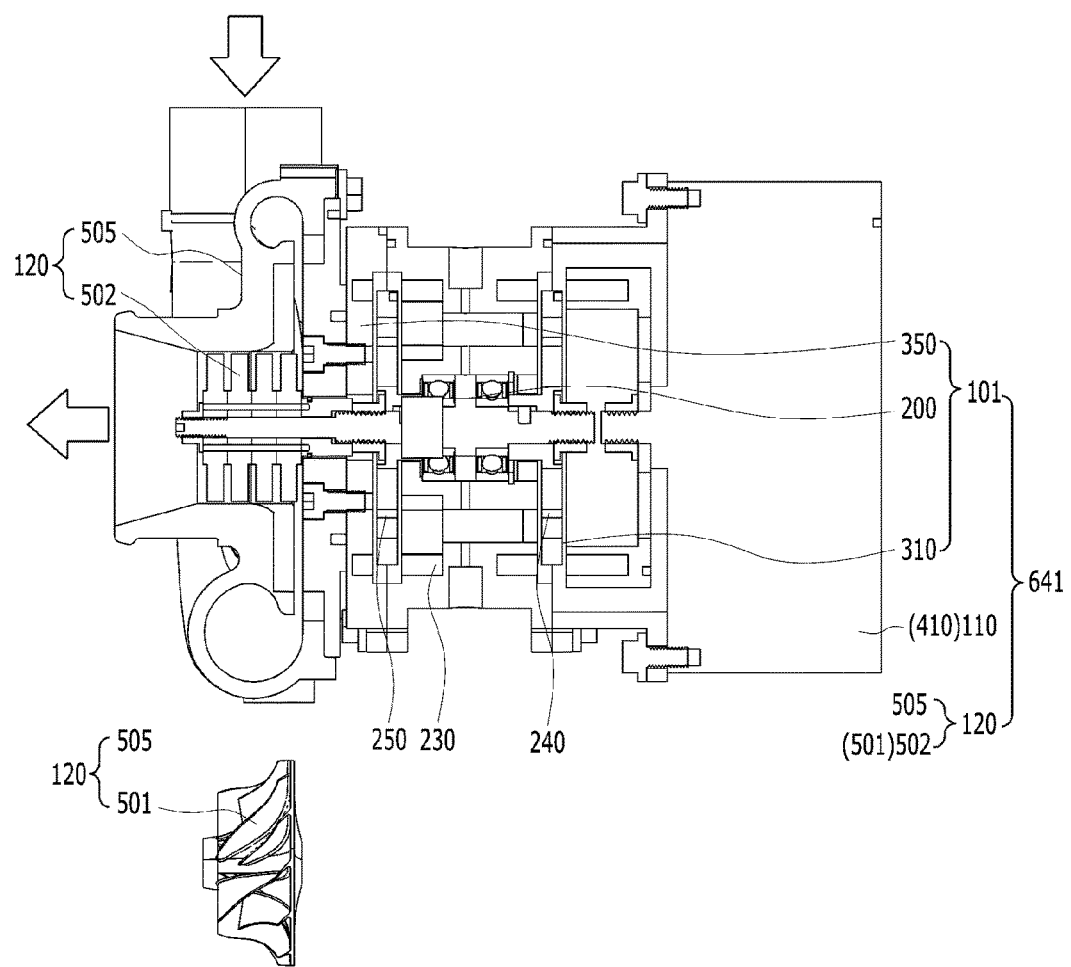

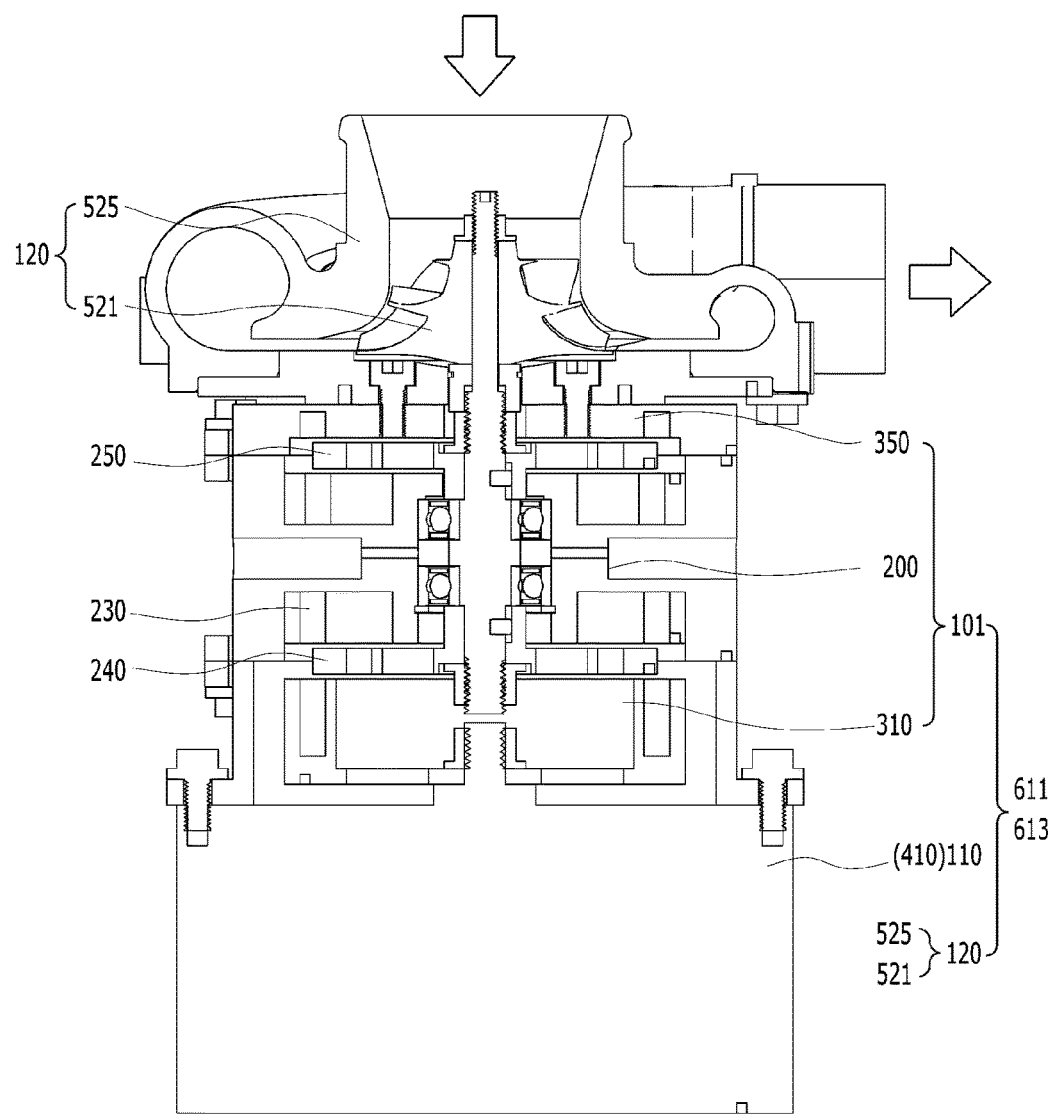
[FIG. 8]

[FIG. 9]
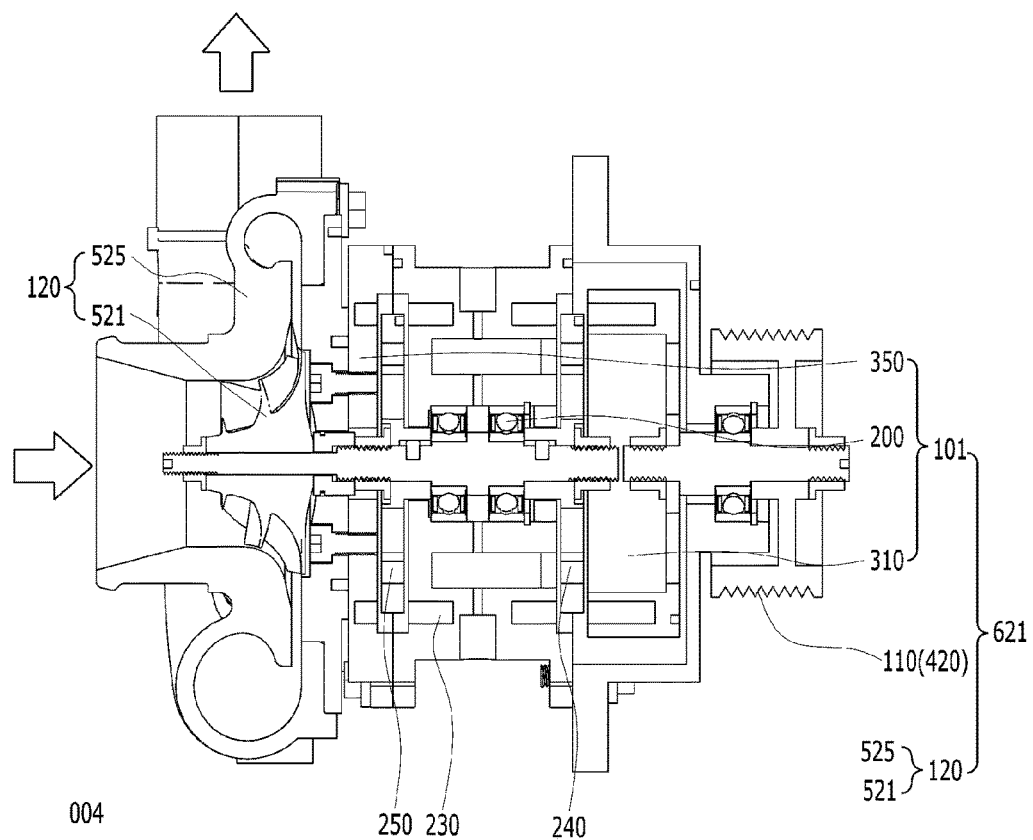

[FIG. 10]
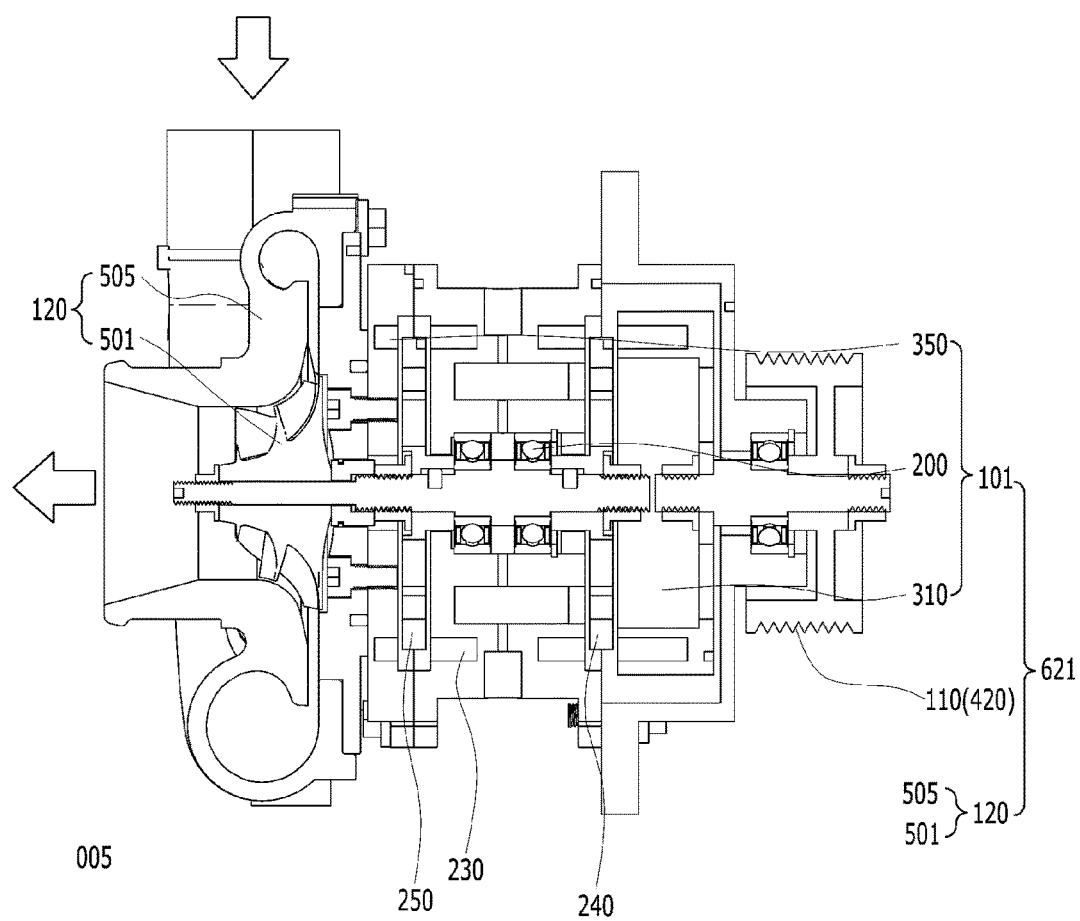

[FIG. 11]
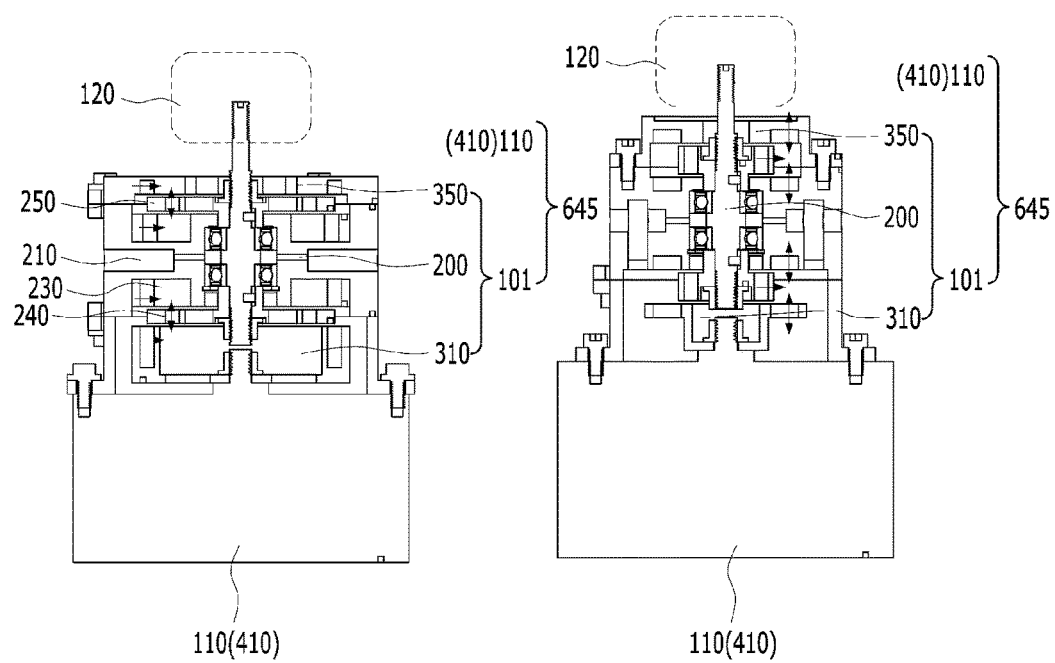

[FIG. 12]
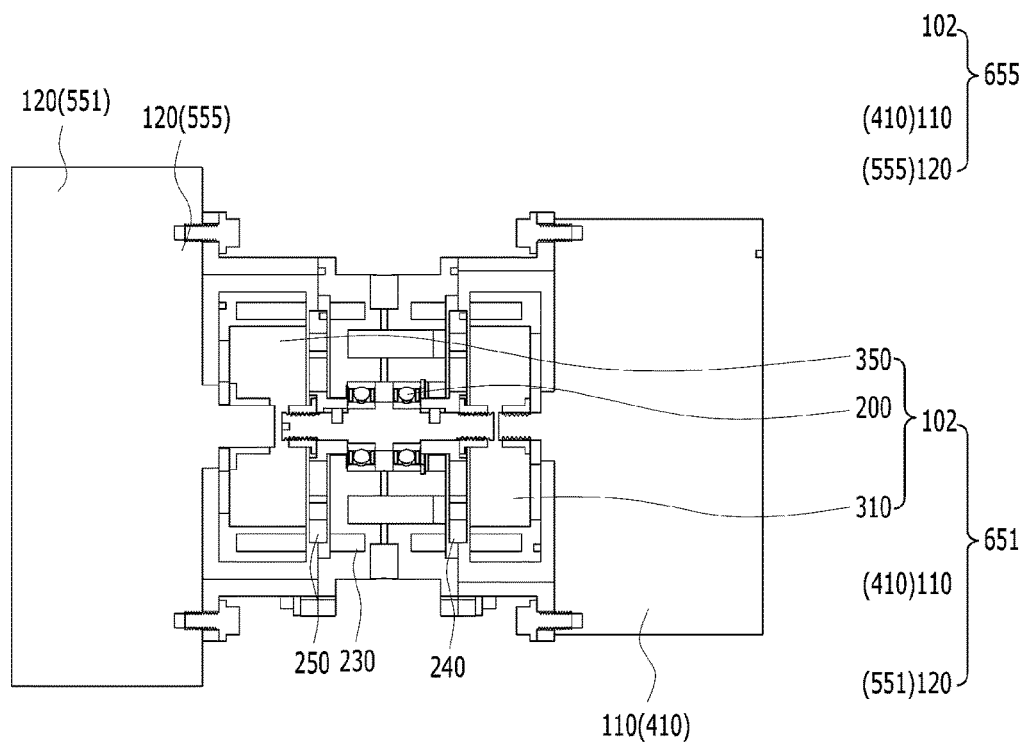

[FIG. 13]
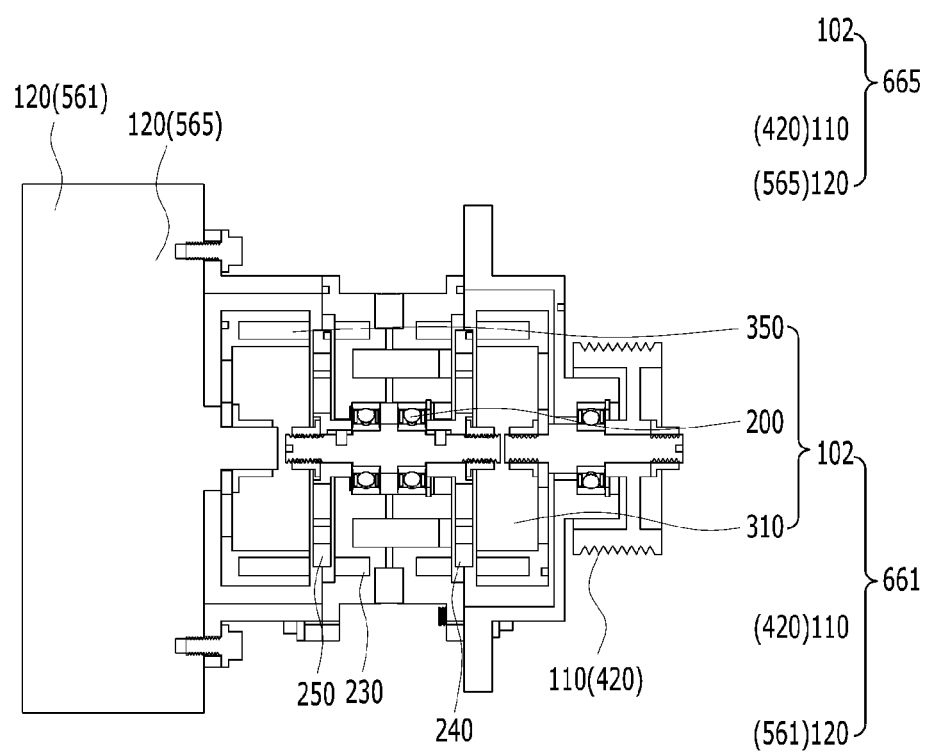

[FIG. 14]
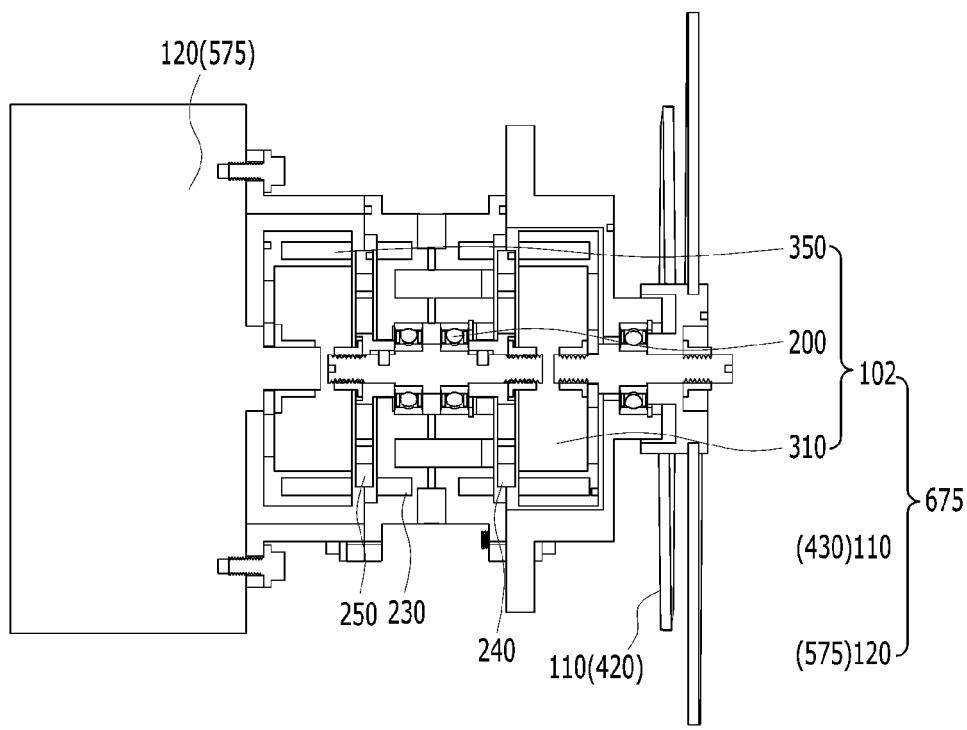

[FIG. 15]
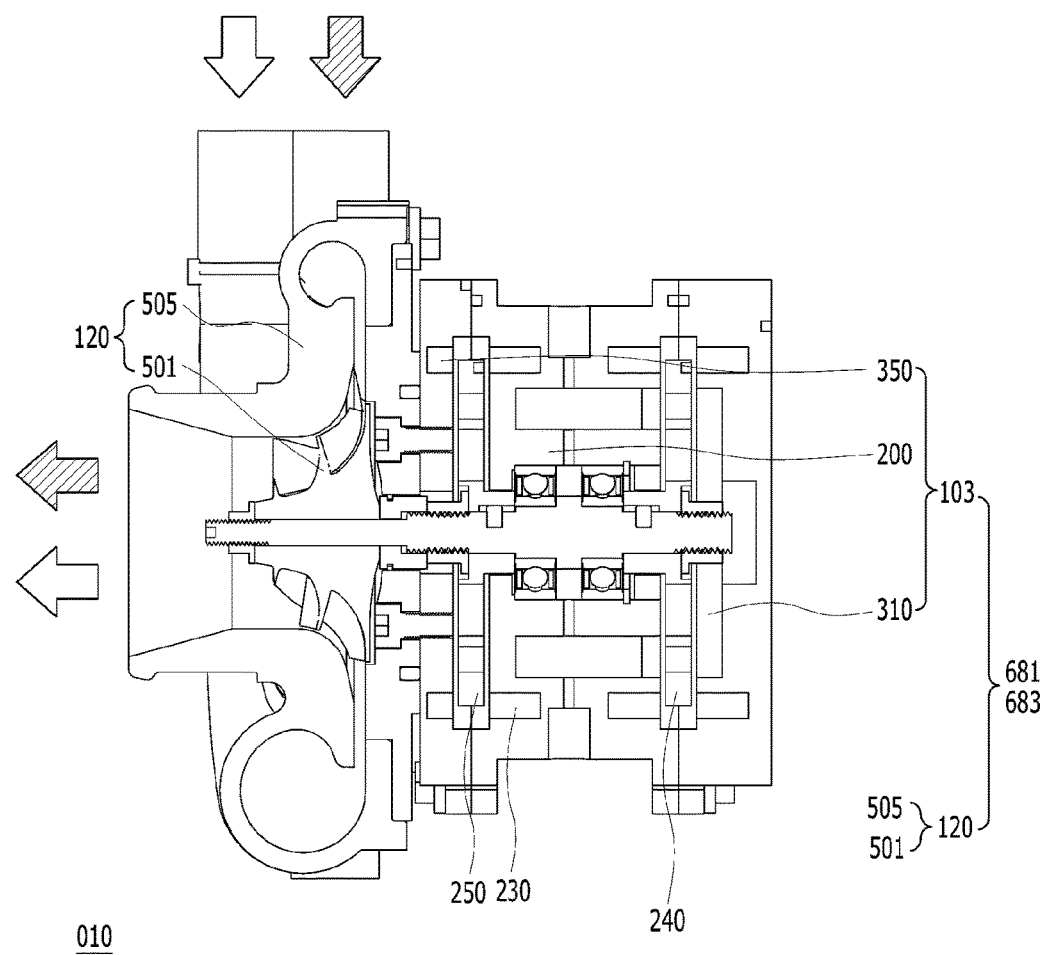

[FIG. 16]
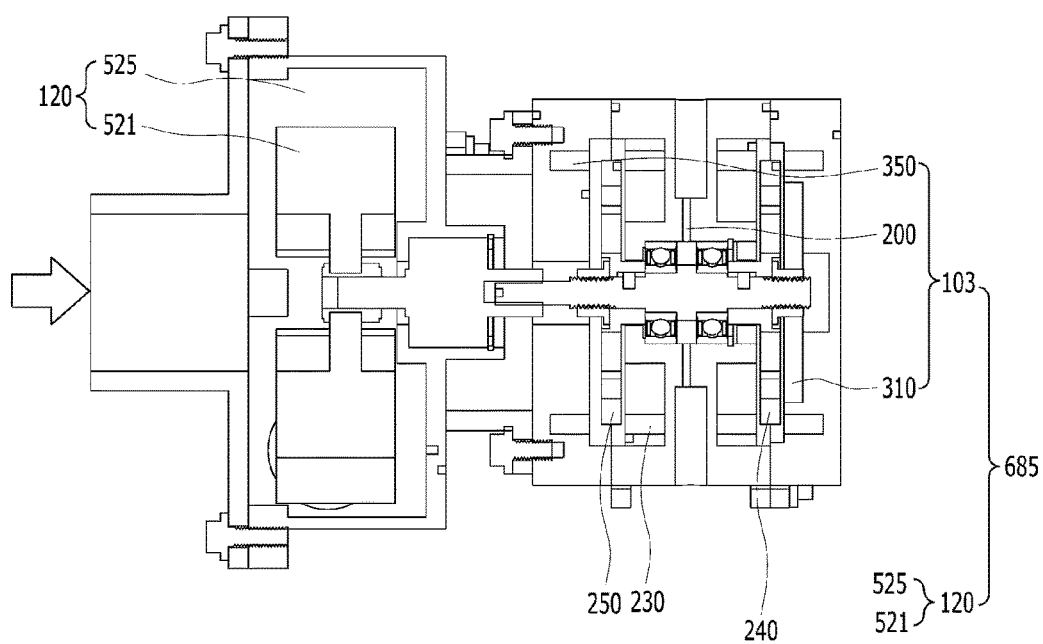

[FIG. 17]
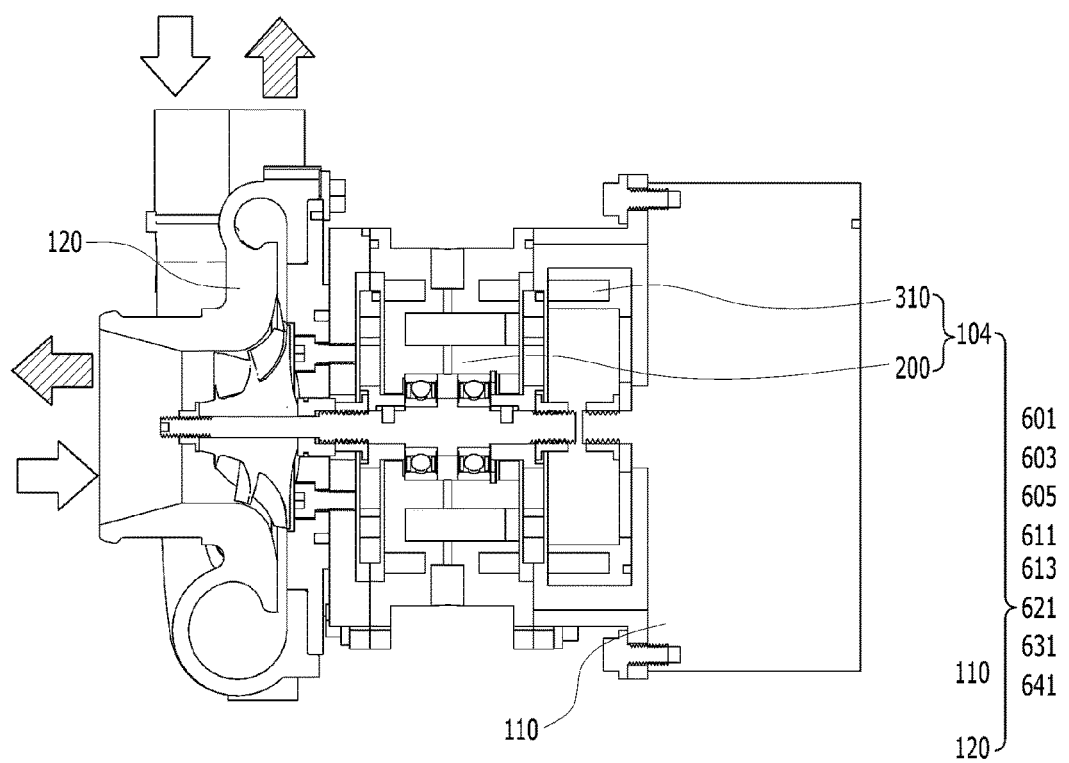

[FIG. 18]
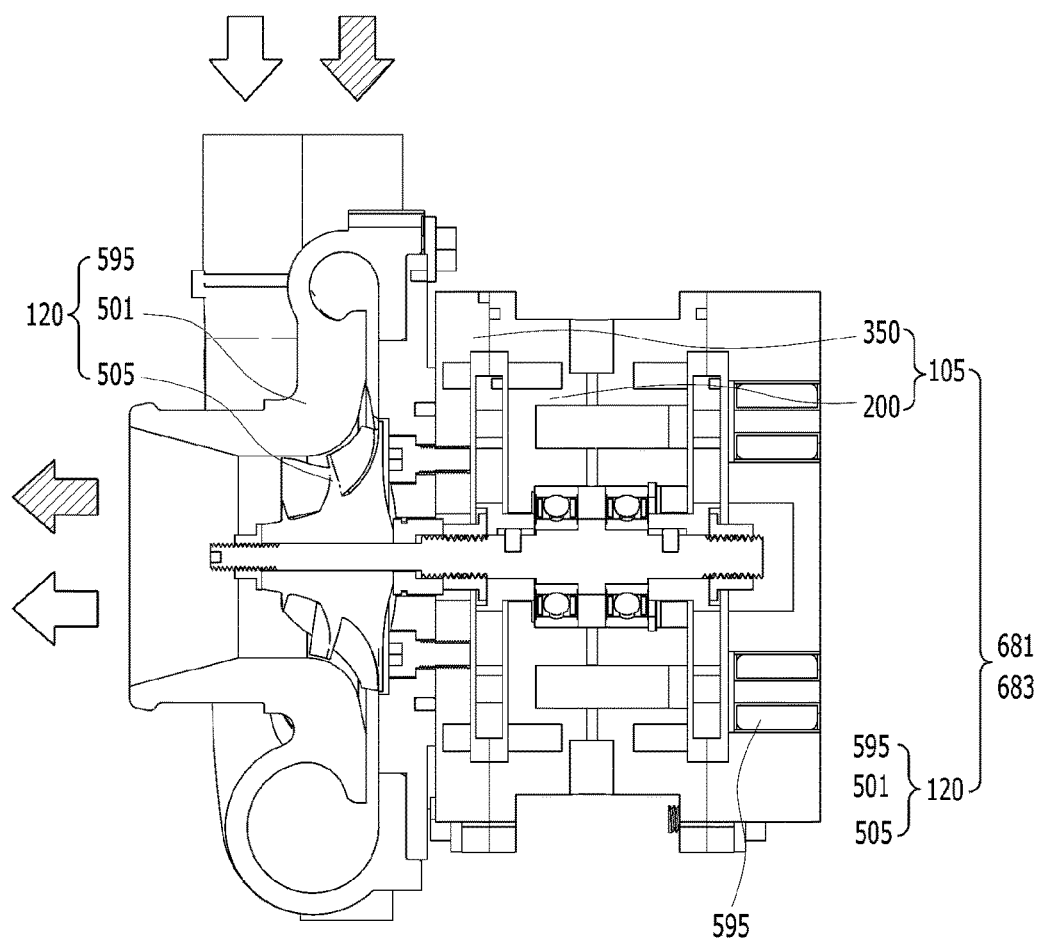

[FIG. 19]
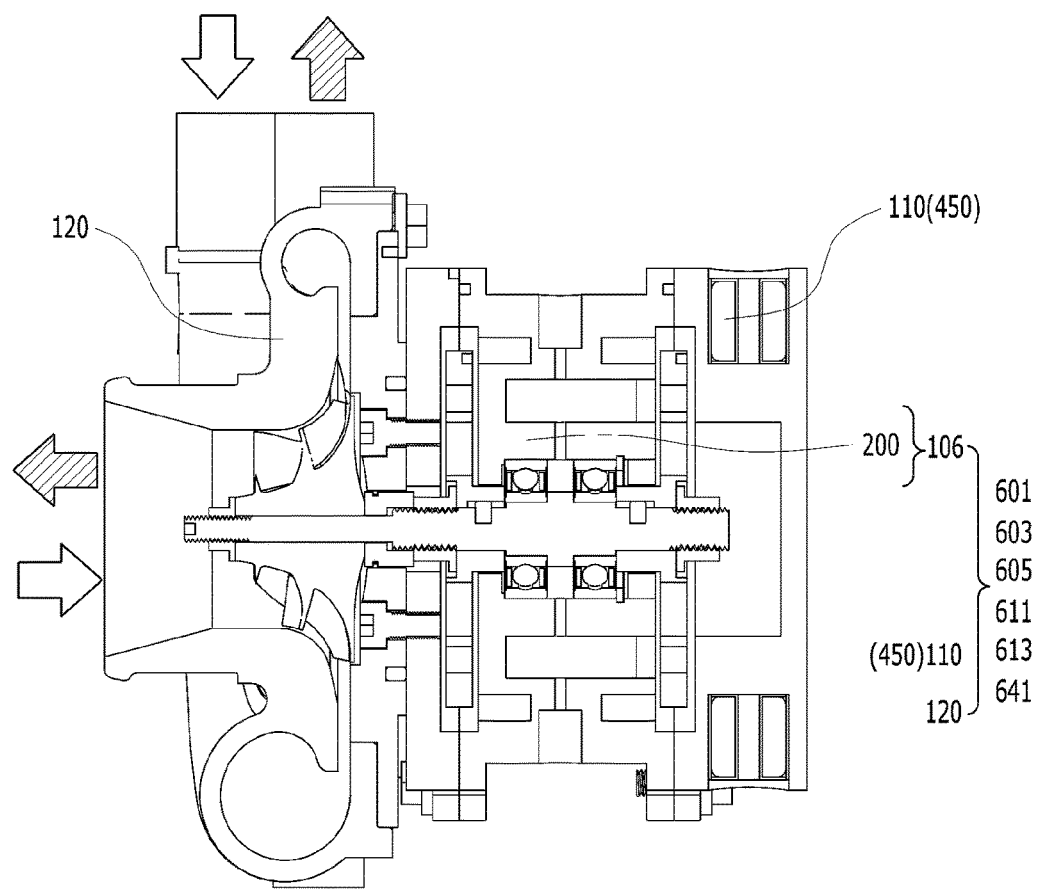

[FIG. 20]
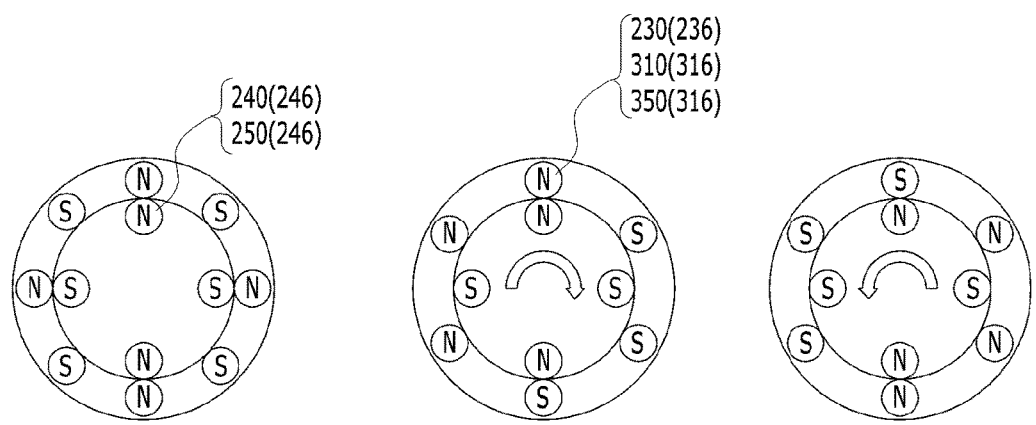

VARIABLE POWER TRANSMISSION DEVICE

CROSS-REFERENCE TO PRIOR APPLICATIONS

This application is a national Stage Patent Application of PCT International Patent Application No. PCT/KR2015/006883, filed on Jul. 03, 2015 under 35 U.S.C. § 371, which claims priority of Korean Patent Application No. 10-2014-0084100, filed on Jul. 05, 2014, which are all hereby incorporated by reference in their entirety.

TECHNICAL FIELD

The present invention relates to a variable power transmission device that is capable of producing a rotational force from magnetic fields generated by receiving rotational power, increasing the rotational force, and finally transmitting the rotational power.

BACKGROUND ART

Generally, thermo-fluid energy is converted into mechanical energy through a heat engine like an internal combustion engine or external combustion engine as means for supplying power to a driving body, or electric energy is converted into mechanical energy through an electric motor, so that power is generated and provided directly to the driving body or is provided to a connected system through a connection member like a gear or belt. Further, fuel as means for producing electric power is burnt, and accordingly, a turbine is driven through a thermal cycle to generate rotational power. Otherwise, the rotational power is generated using natural energy like a wind force or flowing water. Using the rotational power, a generation apparatus is driven to produce the electric power.

With the rotational power or generation power obtained through the above processes, apparatuses are driven and variously used for their purpose, but in the energy converting process, thermo-fluid loss and friction loss may be undesirably caused. Accordingly, when the amount of energy obtained with respect to the amount of energy supplied is indicated as an energy efficiency, many endeavors for enhancing the energy efficiency have been made through the reduction of the energy loss.

Further, even during a power applying driving body using the rotational power or generation power transmits the power to a power receiving driving body and a power receiving object, mechanical loss or electric power loss may be undesirably caused, so that only if a rotational force is produced by the power of the power applying driving body and increased and then transmitted to the power receiving driving body and the power receiving object, the driving energy for supplying the power can be saved.

A cold air blower is a device which is configured to have vanes mounted on a rotating shaft of an electric motor and a cold material is put in a cold material vessel, so that a large amount of air around the vanes is moved at a relatively low pressure by means of the vanes, and the cold material is injected and vaporized to absorb the surrounding heat, to blow cold air, and finally to supply the cold air lowered to a given temperature or below. However, there is a limitation in lowering the cold air to the given temperature or below only with the air movement and the vaporization effect of the cold material, it is inconvenient to exchange or refill the cold material, and the cold air blowing effect is reduced in high humidity places over a given temperature. So as to solve the above-mentioned problems, accordingly, there is a need to propose an electric air cooler that uses the rotational force produced by an induced magnetic field and a rotating magnetic field generated from the rotational power of an electric motor, while not using the air movement and the vaporization effect of the cold material, and increases the produced rotational force to allow a power transmission device to transmit the rotational power to an expander, so that the air is expanded or accelerated in flow to produce the cold air.

An air conditioner is configured wherein a refrigerant is compressed by a compressor so that through condensing, expanding and evaporating processes of the compressed air, cold air is discharged from a heat exchanger, thereby conducting air conditioning for a large range of space. So as to lower the air in the large range of space to a given temperature or below, however, the capacity of the compressor should be large and the cooling performance of the heat exchanger should be improved, so that the amount of power consumed for driving the compressor is increased to cause a substantially high operating cost, and further, a high priced heat exchanger is needed. So as to solve the above-mentioned problems, accordingly, there is a need to propose an electric air cooler that is mounted between a heat exchanger and a blower to produce the rotational force by an induced magnetic field and a rotating magnetic field generated from the rotational power of an electric motor, while having no large capacity compressor or high priced heat exchanger for enhancing the cooling effects and performance, and increases the produced rotational force to allow a power transmission device to transmit the rotational power to an expander, so that the air is expanded or accelerated in flow to produce the cold air.

Further, a vacuum cleaner is configured wherein a fan rotates by an electric motor to produce vacuum and the sucked air and dust are separated from each other through a filter to discharge only air therefrom. So as to enhance the air suction force, however, the capacity of the electric motor should be large so that the amounts of power consumed and noise are increased. So as to solve the above-mentioned problems, accordingly, there is a need to propose an electric air accelerator that produces the rotational force by an induced magnetic field and a rotating magnetic field generated from the rotational power of an electric motor, while not producing the vacuum by the rotation of the fan through the electric motor, and increases the produced rotational force to allow a power transmission device to transmit the rotational power to an expander, so that a vacuum is produced through the acceleration of the sucked air, the flow rate of the air is increased, and the accelerated or expanded air is discharged.

Furthermore, a fuel cell vehicle is configured wherein an electric air compressor is used as an air supplier for supplying air as an oxidizer to a fuel cell in an air processing unit of a fuel cell operating system. Since the electric air compressor drives an impeller through a large capacity motor to conduct air compression, however, the amount of power consumed is large, and since it uses the power produced by the fuel cell or battery-charged power, the capacities and volumes of the fuel cell and battery are bulky, which gives an influence even on the driving distance of the vehicle. So as to solve the above-mentioned problems, accordingly, there is a need to propose an electric air supplier that produces the rotational force by an induced magnetic field and a rotating magnetic field generated from the rotational power of an electric motor, while having no large capacity motor, and increases the produced rotational force to allow a power transmission device to transmit the rotational power to an impeller, so that air is compressed or pressurized, thereby producing the compressed or pressurized air.

A naturally aspirated vehicle is configured wherein since a naturally aspirated internal combustion engine that sucks air in an air sucking process and supplies the air to a combustion chamber is not charged with the amount of air corresponding to the amount of air discharged by means of the air sucking resistance generated in an air suction pipe, there is a limitation in increasing the output, and so as to improve the charging efficiency, accordingly, an inertially pressurized and supercharged air supply type RAM-air charging system using a vehicle speed is adopted. However, the inertially pressurized and supercharged air supply raises the density of air of head wind only while the vehicle is being driven at a high speed and thus increases the charging efficiency, and accordingly, the inertially pressurized and supercharged air supply is limitedly applied to some of vehicles. So as to solve the above-mentioned problems, accordingly, there is a need to propose an electric expanded air charger that is mounted between an air filter and an air suction pipe to produce the rotational force by an induced magnetic field and a rotating magnetic field generated from the rotational power of an electric motor and to increase the produced rotational force to allow a power transmission device to transmit the rotational power to an expander, so that air is expanded or accelerated in flow to produce the expanded or accelerated air with high density.

So as to solve the above-mentioned problems, more desirably, there is a need to propose a mechanical expanded air charger that is mounted on a belt drive system of an internal combustion engine to produce the rotational force by an induced magnetic field and a rotating magnetic field generated from the rotational power of an idle pulley belt-driven using the rotational power of the internal combustion engine and to increase the produced rotational force to allow a power transmission device to transmit the rotational power to an expander, so that air is expanded or accelerated in flow to produce the expanded or accelerated air with high density.

A supercharger like a turbocharger for a supercharged vehicle is mounted on an exhaust manifold exit port surface to drive a turbine wheel and a compressor wheel connected to the turbine wheel by using exhaust gas energy increased according to the load of an internal combustion engine, to compress sucked air, to raise the density of air, and to supply the air to the air suction pipe of the internal combustion engine, thereby increasing the charging efficiency and the output of the internal combustion engine. However, the supercharged vehicle having the turbocharger has a sufficient boost pressure in a high speed driving region, but causes low exhaust gas energy in a low speed driving region so that it does not obtain a desired boost pressure. At this time, disadvantageously, the response time of the vehicle is delayed upon the change of load between the low speed driving region and the dynamic region, an oil supply device is needed to protect the vehicle from exhaust heat, and the load of internal combustion engine is raised due to the increment of back pressure in the high speed driving region. So as to solve the above-mentioned problems, a variable turbocharger, a two-stage turbocharger, a twin charge integral type electrical auxiliary turbocharger, and a complex sequential type supercharging system have been developed and applied to obtain a desired boost pressure and to increase the charging efficiency. However, their structure becomes complicated due to the increment of the number of parts related thereto, and their manufacturing cost becomes high due to the addition of a control system. So as to solve the above-mentioned problems, accordingly, there is a need to propose an electric air charger that is mounted between an air filter and an air suction pipe to produce the rotational force by an induced magnetic field and a rotating magnetic field generated from the rotational power of an electric motor and to increase the produced rotational force to allow a power transmission device to transmit the rotational power to an impeller, so that air is expanded or accelerated in flow to produce the expanded or accelerated air.

A supercharger like a centrifugal supercharger for a supercharged vehicle is configured wherein a set of gear is rotated using a frictional force of a pulley connected through a belt to the rotational power of an internal combustion engine, an impeller is driven with the number of rotations raised by using a gear ratio, and the sucked air to the internal combustion engine is compressed and supplied to an air suction pipe, thereby enhancing the charging efficiency and the output of the internal combustion engine. However, a compressor is driven in proportion to the number of rotations of a crank shaft, so that the response characteristics of the vehicle are excellent upon the change of load of the internal combustion engine, but contrarily, the number of rotations of the internal combustion engine driving the impeller is low on low speed driving, thereby delaying the formation of the boost pressure to cause the delay of acceleration. Further, the number of rotations of the crank shaft is increased to cause the load of the pulley driving the gears to be raised, thereby disadvantageously increasing the driving loss of the internal combustion engine, the noise generated from a connection member, the amount of fuel consumed, and operating costs. So as to solve the above-mentioned problems, accordingly, there is a need to propose a mechanical air charger that is mounted on a belt drive system of an internal combustion engine, instead of the supercharger, to produce the rotational force by an induced magnetic field and a rotating magnetic field generated from the rotational power of an idle pulley belt-driven using the rotational power of the internal combustion engine and to increase the produced rotational force to allow a power transmission device to transmit the rotational power to an impeller, so that air is expanded or accelerated in flow to produce the expanded or accelerated air.

Further, an electric motor is a device that converts electrical energy into mechanical energy to cause a rotational motion, thereby obtaining power supplied to a power receiving object. So as to increase the output of the electric motor and the number of rotations thereof and supply the increased results, if necessary, a converter is used so that the output is raised, the rated capacity is increased, and frequency is modulated. In this case, however, a general electric motor should be changed into an electric motor capable of adjusting frequency, and if the rated capacity is increased, the outer shapes of a rotor and a stator become bulky, large amounts of noise and heat are generated, the amount of power consumed is increased, and the electric power loss and the operation cost are all raised through the use of the converter. So as to solve the above-mentioned problems, accordingly, there is a need to propose a device that is mounted on an electric motor to produce the rotational force by an induced magnetic field and a rotating magnetic field generated from the rotational power of the electric motor, while not raising the output through the exchange of the electric motor and the number of rotations thereof through the converter, and to increase the produced rotational force to transmit the rotational power.

Moreover, an electric compression machine for compressing a refrigerant is configured wherein a piston is driven by an electric motor to compress the refrigerant so that the compressed refrigerant is converted into hot or cold air through condensing, expanding and evaporating. However, the large capacity electric motor driving the piston causes a large amount of power consumed, thereby undesirably raising the operating cost. So as to solve the above-mentioned problems, accordingly, there is a need to propose an electric compression machine that is mounted between an electric motor and a compressor to produce the rotational force by an induced magnetic field and a rotating magnetic field generated from the rotational power of the electric motor and to increase the produced rotational force to induce a magnetic field, so that a power applying device, which is mounted on a rotating shaft of the compressor, drives the compressor with the rotational force produced by the magnetic field.

A user of a vehicle mounts various external power consumption equipment on the vehicle after the vehicle is shipped and makes use of them. If the equipment is used with separate capacitors, the capacitors are charged through the power generated from a vehicle generator, a separate internal combustion engine for power generation, and a generation device of a solar charger, thereby producing power. If the generator of the vehicle charges a vehicle capacitor and further charges separate capacitors through the connection of the separate capacitors to the vehicle capacitor, however, spare generation capacity of the generator should be provided, a fuel cost becomes substantially high due to the increment of the generation load of the internal combustion engine driving the generator, and maintenance and fuel costs become high even with a separate internal combustion engine for power generation. So as to generate the necessary power from the generation device of the solar charger and to charge the power to the equipment, there is need a large capacity solar cell panel that is high priced and has a limitation in mounting space. So as to solve the above-mentioned problems, accordingly, there is a need to propose a small electric generation apparatus that is mounted on an arbitrary space where air freely flows to produce the rotational force by an induced magnetic field and a rotating magnetic field generated from the rotational power of an electric motor, while not producing power from a vehicle generator or generator of a solar charger, and to increase the produced rotational force to induce a magnetic field, so that a power applying device, which is mounted on the rotating shaft of the generator, drives the generator with the rotational force produced by the magnetic field.

If the generation is conducted through the internal combustion engine for power generation, there is a need to propose a small mechanical generation apparatus that produces a rotational force by an induced magnetic field and a rotating magnetic field generated from the rotational power of an idle pulley belt-driven and increases the produced rotational force to induce a magnetic field, so that a power applying device, which is mounted on the rotating shaft of the generator, drives the generator with the rotational force produced by the magnetic field.

Moreover, a mechanical compression machine for compressing a refrigerant is configured wherein a piston connected to a pulley is driven by the rotational power of an internal combustion engine and by the frictional force with the pulley to compress the refrigerant so that the compressed refrigerant is converted into hot or cold air through condensing, expanding and evaporating. Since the rotational power is produced by the belt drive force to drive the piston, however, the frictional loss between the belt and the pulley becomes large to increase the driving loss and noise, the load of the internal combustion engine, the amount of fuel consumed, and the operating cost. So as to solve the above-mentioned problems, accordingly, there is a need to propose a mechanical compression apparatus that is mounted between an idle pulley and a compressor to produce the rotational force by an induced magnetic field and a rotating magnetic field generated from the rotational power of the idle pulley belt-driven and to increase the produced rotational force to induce a magnetic field, so that a power applying device, which is mounted on the rotating shaft of the compressor, drives the compressor with the rotational force produced by the magnetic field.

A wind generation apparatus is configured to increase the number of rotations of vanes with a gear ratio of a gear accelerator connected to the vanes rotating by a wind force to drive a generator, thereby producing power therefrom. If the wind force is weak, however, the rotational power generated from the vanes is small to make the number of rotations of the generator low, thereby causing a small amount of power generated therefrom. If the wind force is strong, contrarily, there are limitations in the noise and durability of the gear accelerator due to the high speed rotation. Further, the vanes should have a given size capable of reaching the number of rotations for the generation to rotate the generator, and also, the noise upon the rotation may be generated. So as to solve the above-mentioned problems, accordingly, there is a need to propose a wind generation apparatus that is mounted between vanes and a generator, instead of a gear accelerator, to produce the rotational force by an induced magnetic field and a rotating magnetic field generated from the rotational power of the vanes, and to increase the produced rotational force to induce a magnetic field, so that a power applying device, which is mounted on the rotating shaft of the generator, drives the generator with the rotational force produced by the magnetic field.

A naturally aspirated vehicle is configured wherein since a naturally aspirated internal combustion engine that sucks air in an air sucking process and supplies the air to a combustion chamber is not charged with the amount of air corresponding to the amount of air discharged by means of the air sucking resistance generated in an air suction pipe, there is a limitation in increasing the output, and so as to improve the charging efficiency, accordingly, the diameter of the air suction pipe is increased to enlarge the flow rate path, the surface of the air suction pipe is smooth to reduce the frictional resistance, or a vortex generation device is provided to enhance an inertial force. However, even if the loss of inertial energy of air flowing in the air suction pipe is reduced, the inertial energy is not almost changed just with the variation of the air flow, thereby failing to achieve a high charging efficiency. Further, the vortex generation device acts as a resistance in a portion of the operating region thereof. So as to solve the above-mentioned problems, accordingly, there is a need to propose an air cooler that is mounted between a throttle body and an air suction pipe to produce the rotational force by a rotating magnetic field generated from the power of air flow caused by a suction pressure and to increase the produced rotational force to allow a power transmission device to transmit the rotational power to an expander, so that air is expanded or accelerated in flow to produce cool air.

A supercharged vehicle having a turbocharger or supercharger is configured to have an air or water cooling device mounted between an exit port of the supercharger and an air suction pipe of an internal combustion engine to lower the temperature of the compressed air supplied from a combustion chamber and to enhance the density of air, thereby improving the supercharging efficiency. If the vehicle stops or is slowly driven, however, cooling performance becomes bad to cause knocking or lower the charging efficiency, and accordingly, cooling capacity should be increased over the whole driving region. However, there is a limitation in mounting the cooling device if the size of the cooling device is increased to improve the cooling performance, and further, there is a limitation in enhancing the cooling efficiency through an electric fan mounted on the cooling device and through the increment of the number of cooling fins, which undesirably raises the manufacturing cost. So as to solve the above-mentioned problems, accordingly, there is a need to propose an air cooler that is mounted between a cooling device and an air suction pipe to produce the rotational force by a rotating magnetic field generated from the power of air flow caused by the boost pressure of the cooling device and to increase the produced rotational force to allow a power transmission device to transmit the rotational power to an expander, so that compressed air is expanded or accelerated in flow to produce cool air.

Further, a fluid transferring apparatus is configured to have a booster pump mounted on the intermediate portion of a flow path pipe and an impeller driven by an electric motor, thereby increasing the amount of fluid discharged from a fluid pump and a pumping head or increasing the pressure and flow rate of the fluid. However, the booster pump drives the electric motor with the use of power, and accordingly, a power supply device should be provided on the outdoor where no power supply exists, thereby raising the operating cost thereof. So as to solve the above-mentioned problems, accordingly, there is a need to propose a fluid accelerator that is mounted on the intermediate portion of a flow path pipe to produce the rotational force by a rotating magnetic field generated from the power of fluid flowing supplied from the fluid pump and to increase the produced rotational force to allow a power transmission device to transmit the rotational power to an impeller, thereby increasing the pressure and flow rate of the fluid.

DISCLOSURE

Technical Problem

Accordingly, the present invention has been made in view of the above-mentioned problems occurring in the prior art, and it is an object of the present invention to provide a variable power transmission device that is applied to an electric air cooler for a cold air blower, an electric air cooler for an air conditioner, an electric air accelerator for a vacuum cleaner, and an electric air supplier for a fuel cell vehicle, so that a rotational force is produced by an induced magnetic field and a rotating magnetic field generated from the rotational power of an electric motor and is increased to transmit the rotational power to an expander or impeller, thereby conducting the power transmission in a simple configuration and achieving small amounts of driving loss and noise, good durability, and no additional driving cost.

It is another object of the present invention to provide a variable power transmission device that is applied to an electric air charger for a supercharged vehicle and an electric expanded air charger for a naturally aspirated vehicle, so that a rotational force is produced by an induced magnetic field and a rotating magnetic field generated from the rotational power of a motor and is increased to transmit the rotational power to an expander or impeller, thereby conducting the power transmission in a simple configuration and achieving small amounts of driving loss and noise, good durability, and no additional driving cost.

It is yet another object of the present invention to provide a variable power transmission device that is applied to a mechanical air charger for a supercharged vehicle and a mechanical expanded air charger for a naturally aspirated vehicle, so that a rotational force is produced by an induced magnetic field, a rotating magnetic field, and an intake pressure of an internal combustion engine generated from the rotational power of an idle pulley drivedly mounted on a belt drive system of the internal combustion engine and is increased to transmit the rotational power to an expander or impeller, thereby conducting the power transmission in a simple configuration and achieving small amounts of driving loss and noise, good durability, and no additional driving cost.

It is still yet another object of the present invention to provide a variable power transmission device that is applied to an electric motor, so that a rotational force is produced by an induced magnetic field and a rotating magnetic field generated from the rotational power of the electric motor and is increased to transmit the rotational power to an expander or impeller, thereby conducting the power transmission in a simple configuration and achieving small amounts of driving loss and noise, good durability, and no additional driving cost.

It is another object of the present invention to provide a variable power transmission device that is applied to an electric compression machine for compressing a refrigerant and to a small electric generation apparatus, so that a rotational force is produced by an induced magnetic field and a rotating magnetic field generated from the rotational power of an electric motor and is increased to induce a rotating magnetic field, thereby transmitting the rotational force generated from the rotating magnetic field to the rotating shaft of a compressor or generator, thereby conducting the power transmission in a simple configuration and achieving small amounts of driving loss and noise, good durability, and no additional driving cost.

It is yet another object of the present invention to provide a variable power transmission device that is applied to a mechanical compression machine for compressing a refrigerant and to a small mechanical generation apparatus, so that a rotational force is produced by an induced magnetic field, a rotating magnetic field, and an intake pressure of an internal combustion engine generated from the rotational power of an idle pulley drivedly mounted on a belt drive system of the internal combustion engine and is increased to induce a rotating magnetic field, thereby transmitting the rotational force generated from the rotating magnetic field to the rotating shaft of a compressor or generator, thereby conducting the power transmission in a simple configuration and achieving small amounts of driving loss and noise, good durability, and no additional driving cost.

It is still another object of the present invention to provide a variable power transmission device that is applied to a wind generation apparatus, so that a rotational force is produced by an induced magnetic field and a rotating magnetic field generated from the rotational power of vanes generated from a wind force and is increased to induce a rotating magnetic field, thereby transmitting the rotational force generated from the rotating magnetic field to the rotating shaft of a compressor or generator, thereby conducting the power transmission in a simple configuration and achieving small amounts of driving loss and noise, good durability, and no additional driving cost.

It is still yet another object of the present invention to provide a variable power transmission device that is applied to an air cooler for a naturally aspirated vehicle, so that a rotational force is produced by a rotating magnetic field generated from the power of air flow generated from an intake pressure and is increased to transmit the rotational power to an expander, thereby conducting the power transmission in a simple configuration and achieving small amounts of driving loss and noise, good durability, and no additional driving cost.

It is yet another object of the present invention to provide a variable power transmission device that is applied to an air cooler for a supercharged vehicle, so that a rotational force is produced by a rotating magnetic field generated from the power of air flow generated from a boost pressure and is increased to transmit the rotational power to an expander, thereby conducting the power transmission in a simple configuration and achieving small amounts of driving loss and noise, good durability, and no additional driving cost.

It is another object of the present invention to provide a variable power transmission device that is applied to a fluid accelerator for a fluid transferring apparatus, so that a rotational force is produced by a rotating magnetic field generated from the power of a fluid flowing along a flow path pipe and is increased to transmit the rotational power to an impeller, thereby conducting the power transmission in a simple configuration and achieving small amounts of driving loss and noise, good durability, and no additional driving cost.

It is still another object of the present invention to provide a variable power transmission device that produces a rotational force from a combination of an induced magnetic field and a rotating magnetic field produced by the power of a power applying driving body or the power of a power receiving driving body and increases the rotational force to transmit the rotational power to the power receiving driving body and a power receiving object, thereby conducting the power transmission in a simple configuration, achieving small amounts of driving loss and noise, good durability, and no additional driving cost, and reducing emission of greenhouse gases such as carbon dioxide by increasing the transmission efficiency with low energy consumption.

Technical Solution

To accomplish the above-mentioned objects, according to a first aspect of the present invention, there is provided a variable power transmission device including: a power generator; and a front driver module and a rear driver module disposed on the front and rear sides of the power generator to produce magnetic fields around the power generator.

According to the present invention, desirably, the power generator is mounted on a power applying driving body, the front driver module on a rotating shaft of the power applying driving body, and the rear driver module on the power generator in such a manner as to receive power from the power applying driving body.

At this time, desirably, a rotational force is produced by an induced magnetic field generated by the front driver module, a rotating magnetic field generated by the power generator, and a rotating magnetic field generated by the power generator together with the rear driver module, using the rotational power supplied from the power applying driving body, and is increased to transmit the rotational power to a power receiving object.

According to the present invention, desirably, the power generator includes: a front rotor; a rear rotor; bearing modules for mounting the front rotor and the rear rotor to support the rotations of the front rotor and the rear rotor; driver modules for producing magnetic fields around the front rotor and the rear rotor; a frame for mounting the bearing module and the driver modules; lock nuts for fixing the front rotor and the rear rotor to the bearing module; and a fixture for fixing the bearing module to the frame.

According to the present invention, desirably, the frame is configured to have 2n (n is an integer greater than 2) or 3n equally spaced permanent magnet insertion holes or mounting surfaces for mounting the driver modules formed in a circumferential direction of an axis of a cylindrical body thereof with respect to reference points on front and rear inner peripheral surfaces around the axis of the cylindrical body, mounting and cooling spaces for the bearing module formed on the inner peripheral surface thereof in correspondence to the shape of the bearing module selected from a grease lubrication type bearing, an oil lubrication type bearing, an air cooling type bearing, and a magnetic bearing, and mounting surfaces formed on the front and rear surfaces of the body thereof to mount the power applying driving body, the power receiving driving body, and the front driver module and the rear driver module thereon.

According to the present invention, desirably, the bearing module includes: a rotating shaft having bearing mounting surfaces, a bearing fixing projection, and fixing grooves and screw threads for fixing the phases of the front rotor and the rear rotor formed on a round rod-shaped body thereof; bearings selected from a grease supply cooling type bearing, an oil supply cooling type bearing, an air cooling type bearing, and a magnetic bearing; and a fixture for fixing a phase.

According to the present invention, desirably, each of the front rotor and the rear rotor includes: a rotary plate having a cylindrical protruding portion formed from the center of a disc-shaped body thereof, a slot formed on the inner peripheral surface of the cylindrical protruding portion to fix a phase, and 2n (n is an integer) permanent magnet insertion holes formed equally spaced on the circumferential axis of the body with respect to the slot; and 2n permanent magnets inserted into the permanent magnet insertion holes with respect to the slot of the rotary plate in such a manner where N and S poles are alternately insertedly attached thereto.

According to the present invention, desirably, each driver module includes 2n (n is an integer greater than 2) or 3n permanent magnets attachedly inserted into the permanent magnet insertion holes of the frame with respect to the reference point of the frame in such a manner where N and S poles are alternately insertedly attached thereto or insertedly attached thereto with three-phase arrangements, and otherwise, includes: a fixing rod having 2n or 3n permanent magnet insertion holes formed equally spaced in the circumferential axis direction around the front rotor and the rear rotor with respect to a reference point of a cylindrical body; and 2n or 3n permanent magnets attachedly inserted into the 2n or 3n permanent magnet insertion holes with respect to the reference point of the fixing rod in such a manner where the N and S poles are alternately insertedly attached thereto or insertedly attached thereto with three-phase arrangements.

According to the present invention, desirably, the front driver module includes: a fixing rod having a mounting surface formed on a cylindrical body whose one surface is closed to mount the power applying driving body and the power generator thereon and 2n (n is an integer greater than 2) or 3n permanent magnet insertion holes formed equally spaced in a circumferential direction around the front rotor with respect to a reference point thereof, while having a given gap from the front rotor; and 2n or 3n permanent magnets attachedly inserted into the 2n or 3n permanent magnet insertion holes with respect to the reference point of the fixing rod in such a manner where N and S poles are alternately insertedly attached thereto or insertedly attached thereto with three-phase arrangements.

According to the present invention, desirably, the rear driver module includes: a fixing rod having a mounting surface formed on a cylindrical body whose one surface is closed to mount the power receiving driving body and the power generator thereon and 2n (n is an integer greater than 2) or 3n permanent magnet insertion holes formed equally spaced in a circumferential direction around the rear rotor with respect to a reference point thereof, while having a given gap from the rear rotor; and 2n or 3n permanent magnets attachedly inserted into the 2n or 3n permanent magnet insertion holes with respect to the reference point of the fixing rod in such a manner where N and S poles are alternately insertedly attached thereto or insertedly attached thereto with three-phase arrangements.

According to the present invention, desirably, the magnetic fluxes of the front rotor and the rear rotor of the power generator are produced in the axial direction of the frame or in the direction of the axial diameter of the frame, and the magnetic fluxes of the driver modules of the power generator and the magnetic fluxes of the front driver module and the rear driver module are produced in a perpendicular direction to the magnetic fluxes of the front rotor and the rear rotor of the power generator, while having a given gap therefrom.

To accomplish the above-mentioned objects, according to a second aspect of the present invention, there is provided a variable power transmission device including: a power generator; a front driver module; and a rear driver module.

At this time, the variable power transmission device is disposed between a power applying driving body and a power receiving driving body in such a manner where the power generator is mounted on the power applying driving body and the power receiving driving body, the front driver module on the rotating shaft of the power applying driving body, and the rear driver module on the rotating shaft of the power receiving driving body in such a manner as to receive the power from the power applying driving body.

At this time, desirably, a rotational force is produced by an induced magnetic field generated by the front driver module and a rotating magnetic field generated by the power generator, using the rotational power supplied from the power applying driving body, and is increased to induce a rotating magnetic field to the rear driver module, so that the rear driver module produces the rotational force to transmit the rotational power to the power receiving driving body.

To accomplish the above-mentioned objects, according to a third aspect of the present invention, there is provided a variable power transmission device including: a power generator; a front driver module; and a rear driver module.

At this time, desirably, the power generator is mounted on the power applying driving body to mount a rotary body of a power receiving driving body and the front driver module and the rear driver module are mounted on the power generator to receive the power from the power receiving driving body.

According to the present invention, desirably, a rotational force is produced by a rotating magnetic field generated by the power generator and a rotating magnetic field generated by the power generator together with the front driver module and the rear driver module, using the rotational power supplied from the power receiving driving body, and is increased to transmit the rotational power to the power receiving driving body.

To accomplish the above-mentioned objects, according to a fourth aspect of the present invention, there is provided a variable power transmission device including: a power generator; and a front driver module.

At this time, desirably, the power generator is mounted on the power applying driving body and the front driver module is mounted on the rotating shaft of the power applying driving body in such a manner as to receive the power from the power applying driving body.

According to the present invention, desirably, a rotational force is produced by an induced magnetic field generated by the front driver module and a rotating magnetic field generated by the power generator, using the rotational power supplied from the power applying driving body, and is increased to transmit the rotational power to a power receiving object.

To accomplish the above-mentioned objects, according to a fifth aspect of the present invention, there is provided a variable power transmission device including: a power generator; and a rear driver module.

At this time, desirably, the power generator is mounted on a power receiving driving body to mount a rotary body of the power receiving driving body and the rear driver module is mounted on the power generator in such a manner as to receive the power from the power receiving driving body.

According to the present invention, desirably, a rotational force is produced by a rotating magnetic field generated by the power generator and a rotating magnetic field generated by the power generator together with the rear driver module, using the rotational power supplied from the power receiving driving body, and is increased to transmit the rotational power and the power of the rotating magnetic fields to the power receiving driving body.

To accomplish the above-mentioned objects, according to a sixth aspect of the present invention, there is provided a variable power transmission device including a power generator.

At this time, desirably, the power generator is mounted on the power applying driving body in such a manner as to receive the power from the power applying driving body.

According to the present invention, desirably, a rotational force is produced by a rotating magnetic field generated by the power generator, using the power of an induced magnetic field supplied from the power applying driving body, and is increased to transmit the rotational power to a power receiving object.

Advantageous Effects

According to the present invention, the variable power transmission device is applied to an electric air cooler for a cold air blower, an electric air cooler for an air conditioner, an electric air accelerator for a vacuum cleaner, and an electric air supplier for a fuel cell vehicle, so that the rotational force is produced by the induced magnetic field generated from the front driver module, the rotating magnetic field generated from the power generator, and the rotating magnetic field generated from the power generator together with the rear driver module, using the rotational power of the low power motor, and is increased to allow the power generator to transmit the rotational power to the expander or impeller, thereby conducting the power transmission in a simple configuration and achieving small amounts of driving loss and noise, good durability, and no additional driving cost.

According to the present invention, further, the variable power transmission device is applied to an electric air charger for a supercharged vehicle and an electric expanded air charger for a naturally aspirated vehicle, so that the rotational force is produced by the induced magnetic field generated from the front driver module, the rotating magnetic field generated from the power generator, the rotating magnetic field generated from the power generator together with the rear driver module, and the intake pressure of the internal combustion engine, using the rotational power of the low power motor, and is increased to transmit the rotational power to the expander or impeller, thereby conducting the power transmission in a simple configuration and achieving small amounts of driving loss and noise, good durability, and no additional driving cost.

According to the present invention, furthermore, the variable power transmission device is applied to a mechanical air charger for a supercharged vehicle and a mechanical expanded air charger for a naturally aspirated vehicle, so that the rotational force is produced by the induced magnetic field generated from the front driver module, the rotating magnetic field generated from the power generator, the rotating magnetic field generated from the power generator together with the rear driver module, and the intake pressure of the internal combustion engine, using the rotational power of the idle pulley drivedly mounted on the belt drive system of the internal combustion engine, and is increased to transmit the rotational power to the expander or impeller, thereby conducting the power transmission in a simple configuration and achieving small amounts of driving loss and noise, good durability, and no additional driving cost.

According to the present invention, also, the variable power transmission device is applied to an electric motor, so that the rotational force is produced by the induced magnetic field generated from the front driver module, the rotating magnetic field generated from the power generator, and the rotating magnetic field generated from the power generator together with the rear driver module, using the rotational power of the low power motor, and is increased to transmit the rotational power to a power receiving object, thereby conducting the power transmission in a simple configuration and achieving small amounts of driving loss and noise, good durability, and no additional driving cost.

According to the present invention, additionally, the variable power transmission device is applied to an electric compression machine for compressing a refrigerant and to a small electric generation apparatus, so that the rotational force is produced by the induced magnetic field generated from the front driver module and the power generator and the rotating magnetic field generated from the power generator, using the rotational power of the low power motor, and is increased to induce the rotating magnetic field to the rear driver module, to allow the rear driver module to produce the rotational force, and to transmit the rotational force to the rotating shaft of the compressor or generator, thereby conducting the power transmission in a simple configuration and achieving small amounts of driving loss and noise, good durability, and no additional driving cost.

According to the present invention, moreover, the variable power transmission device is applied to a mechanical compression machine for compressing a refrigerant and to a small mechanical generation apparatus, so that the rotational force is produced by the induced magnetic field generated from the front driver module and the power generator and the rotating magnetic field generated from the power generator, using the rotational power of the idle pulley drivedly mounted on the belt drive system of the internal combustion engine, and is increased to induce the rotating magnetic field to the rear driver module, to allow the rear driver module to produce the rotational force, and to transmit the rotational force to the rotating shaft of the compressor or generator, thereby conducting the power transmission in a simple configuration and achieving small amounts of driving loss and noise, good durability, and no additional driving cost.

According to the present invention, further, the variable power transmission device is applied to a wind generation apparatus, so that the rotational force is produced by the induced magnetic field generated from the front driver module and the power generator and the rotating magnetic field generated from the power generator, using the rotational power of the vanes, and is increased to induce the rotating magnetic field to the rear driver module, to allow the rear driver module to produce the rotational force, and to transmit the rotational force to the rotating shaft of the generator, thereby conducting the power transmission in a simple configuration and achieving small amounts of driving loss and noise, good durability, and no additional driving cost.

According to the present invention, furthermore, the variable power transmission device is applied to an air cooler for a naturally aspirated vehicle, so that the rotational force is produced by the rotating magnetic field generated from the power generator and the rotating magnetic field generated from the power generator together with the front driver module and the rear driver module, using the power of air flow generated from the intake pressure and the rotational power of the expander generated by the power of air flow, and is increased to allow the power generator to transmit the rotational power to the expander, thereby conducting the power transmission in a simple configuration and achieving small amounts of driving loss and noise, good durability, and no additional driving cost.

According to the present invention, in addition, the variable power transmission device is applied to an air cooler for a supercharged vehicle, so that the rotational force is produced by the rotating magnetic field generated from the power generator and the rotating magnetic field generated from the power generator together with the front driver module and the rear driver module, using the power of air flow generated from the boost pressure and the rotational power of the expander generated by the power of air flow, and is increased to allow the power generator to transmit the rotational power to the expander, thereby conducting the power transmission in a simple configuration and achieving small amounts of driving loss and noise, good durability, and no additional driving cost.

According to the present invention, further, the variable power transmission device is applied to a fluid accelerator for a fluid transferring apparatus, so that the rotational force is produced by the rotating magnetic field generated from the power generator and the rotating magnetic field generated from the power generator together with the front driver module and the rear driver module, using the power of air flow generated from the boost pressure and the rotational power of the expander generated by the power of air flow, and is increased to allow the power generator to transmit the rotational power to the expander, thereby conducting the power transmission in a simple configuration and achieving small amounts of driving loss and noise, good durability, and no additional driving cost.

According to the present invention, further, the variable power transmission device is applied to an electric air cooler for a cold air blower, an electric air cooler for an air conditioner, an electric air accelerator for a vacuum cleaner, an electric air supplier for a fuel cell vehicle, electric and mechanical expanded air chargers for a naturally aspirated vehicle, and electric and mechanical air chargers for a supercharged vehicle, so that the rotational force is produced by the induced magnetic field generated from the front driver module and the rotating magnetic field generated from the power generator, using the rotational power of the low power motor or the belt drive system, and is increased to transmit the rotational power to the expander or impeller, thereby conducting the power transmission in a simple configuration and achieving small amounts of driving loss and noise, good durability, and no additional driving cost.

According to the present invention, furthermore, the variable power transmission device is applied to an air cooler for a naturally aspirated vehicle and an air cooler for a supercharged vehicle, so that the rotational force is produced by the rotating magnetic field generated from the power generator and the rotating magnetic field generated from the power generator together with the rear driver module, using the power of air by intake pressure or the power of air flow by the boost pressure of the internal combustion engine, and is increased to allow the power generator to transmit the rotational power to the expander and to transmit the power of the rotating magnetic field to the generator, thereby producing the power under a simple structure and having small amounts of driving loss and noise, good durability, and no additional driving cost.

According to the present invention, additionally, the variable power transmission device is applied to a magnetic drive air cooler for a cold air blower, a magnetic drive air cooler for an air conditioner, a magnetic drive air accelerator for a vacuum cleaner, a magnetic drive air supplier for a fuel cell vehicle, a magnetic drive expanded air charger for a naturally aspirated vehicle, and a magnetic drive air charger for a supercharged vehicle, so that the rotational force is produced by the rotating magnetic field generated from the power generator, using the power of the induced magnetic field supplied from a magnetic generator using low power, and is increased to transmit the rotational power, thereby conducting the power transmission in a simple configuration and achieving small amounts of driving loss and noise, good durability, and no additional driving cost.

According to the present invention, furthermore, the variable power transmission device produces the rotational force from a combination of the induced magnetic field generated from the front driver module, the rotating magnetic field generated from the power generator together with the front driver module, the rotating magnetic field generated from the power generator, the rotating magnetic field generated from the power generator together with the rear driver module, and the induced magnetic field generated from the power generator together with the rear driver module, using the power of the power applying driving body or the power of the power receiving driving body, and increases the rotational force to transmit the rotational power to the power receiving driving body and the power receiving object, thereby conducting the power transmission in a simple configuration, achieving small amounts of driving loss and noise, good durability, and no additional driving cost, and reducing emission of greenhouse gases such as carbon dioxide by increasing the transmission efficiency with low energy consumption.

DESCRIPTION OF DRAWINGS

FIG. 1 is a perspective view showing an electric air cooler for a cold air blower, an electric air cooler for an air conditioner, and an electric expanded air charger for a naturally aspirated vehicle, to which a variable power transmission device according to a first embodiment of the present invention is applied.

FIG. 2 is a sectional perspective view showing a frame of a power generator in the variable power transmission device according to the first embodiment of the present invention.

FIG. 3 is a sectional perspective view showing a bearing module in the variable power transmission device according to the first embodiment of the present invention.

FIG. 4 is a sectional perspective view showing a front rotor and a rear rotor in the variable power transmission device according to the first embodiment of the present invention.

FIG. 5 is a perspective view showing driver modules in the variable power transmission device according to the first embodiment of the present invention.

FIG. 6 is a perspective view showing a front driver module and a rear driver module in the variable power transmission device according to the first embodiment of the present invention.

FIG. 7 is a perspective view showing an electric air accelerator for a vacuum cleaner to which the variable power transmission device according to the first embodiment of the present invention is applied.

FIG. 8 is a perspective view showing an electric air charger for a supercharged vehicle and an electric air supplier for a fuel cell vehicle, to which the variable power transmission device according to the first embodiment of the present invention is applied.

FIG. 9 is a perspective view showing a mechanical air accelerator for a supercharged vehicle to which the variable power transmission device according to the first embodiment of the present invention is applied.

FIG. 10 is a perspective view showing a mechanical expanded air charger for a naturally aspirated vehicle to which the variable power transmission device according to the first embodiment of the present invention is applied.

FIG. 11 is a perspective view showing the directions of the magnetic fields of a motor, rotors and driver modules.

FIG. 12 is a perspective view showing an electric compression machine for compressing a refrigerant and a small electric generation apparatus, to which a variable power transmission device according to a second embodiment of the present invention is applied.

FIG. 13 is a perspective view showing a mechanical compression machine for compressing a refrigerant and a small mechanical generation apparatus, to which the variable power transmission device according to the second embodiment of the present invention is applied.

FIG. 14 is a perspective view showing a wind generator to which the variable power transmission device according to the second embodiment of the present invention is applied.

FIG. 15 is a perspective view showing air coolers for a naturally aspirated vehicle and a supercharged vehicle to which a variable power transmission device according to a third embodiment of the present invention is applied.

FIG. 16 is a perspective view showing a fluid accelerator for a fluid transferring apparatus to which the variable power transmission device according to the third embodiment of the present invention is applied.

FIG. 17 is a perspective view showing an electric air cooler for a cold air blower, an electric air cooler for an air conditioner, an electric air accelerator for a vacuum cleaner, an electric air supplier for a fuel cell vehicle, electric and mechanical expanded air chargers for a naturally aspirated vehicle, and electric and mechanical air chargers for a supercharged vehicle, to which a variable power transmission device according to a fourth embodiment of the present invention is applied.

FIG. 18 is a perspective view showing air coolers for a naturally aspirated vehicle and a supercharged vehicle to which a variable power transmission device according to a fifth embodiment of the present invention is applied.

FIG. 19 is a perspective view showing a magnetic drive air cooler for a cold air blower, a magnetic drive air cooler for an air conditioner, a magnetic drive air accelerator for a vacuum cleaner, a magnetic drive air supplier for a fuel cell vehicle, a magnetic drive expanded air charger for a naturally aspirated vehicle, and a magnetic drive air charger for a supercharged vehicle, to which a variable power transmission device according to a sixth embodiment of the present invention is applied.

FIG. 20 is a side view showing the arrangements of permanent magnets on the rotors and driver modules according to the present invention.

BEST MODE FOR INVENTION

Hereinafter, an explanation on the parts and operations of a variable power transmission device according to the present invention will be in detail given with reference to the attached drawing.

All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

Now, an explanation on the parts and operations of a variable power transmission device 101 according to a first embodiment of the present invention will be given.

First, the parts of the variable power transmission device 101 will be explained.

As shown in FIGS. 1, 7, 8, 9, 10, 11 and 20, a variable power transmission device 101 according to a first embodiment of the present invention includes a power generator 200 and a front driver module 310 and a rear driver module 350 disposed on the front and rear sides of the power generator 200 to produce magnetic fields around the power generator 200. In the configuration, the power generator 200 is mounted on a power applying driving body 110, the front driver module 310 on a rotating shaft of the power applying driving body 110, and the rear driver module 350 on the power generator 200.

In more detail, the variable power transmission device 101 includes the power generator 200 and the front driver module 310 and the rear driver module 350 disposed on the front and rear sides of the power generator 200 to produce the magnetic fields around the power generator 200 in such a manner where the power generator 200 is mounted on the power applying driving body 110, the front driver module 310 on the rotating shaft of the power applying driving body 110, and the rear driver module 350 on the power generator 200.

The power generator 200 is configured wherein a bearing module 220 is mounted on a frame 210 to support the rotations of a front rotor 240 and a rear rotor 250 thereagainst in such a manner as to be fixed by means of a fixture 270 like a snap ring or a lock nut, the front rotor 240 and the rear rotor 250 are mounted on the bearing module 220 and fixed by means of lock nuts 260, and driver modules 230 are mounted on the frame 210 to produce the magnetic forces around the front rotor 240 and the rear rotor 250.

In more detail, the power generator includes the front rotor 240, the rear rotor 250, the bearing module 220 for mounting the front rotor 240 and the rear rotor 250 thereon to support their rotations, the driver modules 230 for producing the magnetic forces around the front rotor 240 and the rear rotor 250, the frame 210 for mounting the bearing module 220 and the driver modules 230, the lock nuts 260 for fixing the front rotor 240 and the rear rotor 250 to the bearing module 220, and the fixture 270 for fixing the bearing module 220 to the frame 210.

In the configuration, as shown in FIGS. 1, 2 and 8, the frame 210 is configured to have permanent magnet insertion holes 213 formed equally spaced in a circumferential direction of an axis of a cylindrical body thereof with respect to reference points 211 on front and rear inner peripheral surfaces 218 around the axis, to have a mounting space for the bearing module 220 and a bearing cooling space 212 formed on the inner peripheral surface thereof, and to have mounting surfaces 214 formed on the front and rear surfaces of the body to mount the power applying driving body 110, a power receiving driving body 120, and the front driver module 310 and the rear driver module 350 thereon. Further, the frame 210 has mounting surfaces 218 formed on the front and rear inner peripheral surfaces of the body thereof to mount the driver modules 230 with respect to the reference points 211. Also, the mounting space for the bearing module 220 and the bearing cooling space 212 are formed in correspondence to the shape of the bearing module 220 selected from a grease lubrication type bearing, an oil lubrication type bearing, an air cooling type bearing, and a magnetic bearing.

In more detail, the frame 210 is configured to have 2n (hereinafter, n is an integer greater than 2) or 3n permanent magnet insertion holes 213 formed equally spaced in a circumferential direction of an axis of a cylindrical body thereof or the mounting surfaces 218 for the driver modules 230 with respect to reference points 211 on the front and rear inner peripheral surfaces 218 around the axis of the cylindrical body thereof, to have the mounting space for the bearing module 220 and the bearing cooling space 212 formed in correspondence to the shape of the bearing module 220 selected from a grease lubrication type bearing, an oil lubrication type bearing, an air cooling type bearing, and a magnetic bearing, and to have the mounting surfaces 214 formed on the front and rear surfaces of the body to mount the power applying driving body 110, the power receiving driving body 120, and the front driver module 310 and the rear driver module 350 thereon.

As shown in FIGS. 1 and 3, the bearing module 220 includes a rotating shaft 221 formed on a round rod-shaped body and having bearing mounting surfaces 223 and a bearing fixing projection 222 formed on the outer peripheral surface thereof and fixing grooves 224 and screw threads 225 for fixing the phases of the front rotor 240 and the rear rotor 250, bearings 226 mounted on the rotating shaft 221 to support the rotation of the rotating shaft 221, and a fixture 227 for fixing a phase. Further, each bearing 226 of the bearing module 220 is any one selected from a grease supply cooling type bearing, an oil supply cooling type bearing, an air cooling type bearing, and a magnetic bearing, so that the bearing module 220 is not over an allowable limit for ensuring fatigue life in accordance with the maximum number of rotations of the front rotor 240 and the rear rotor 250.

In more detail, the bearing module 220 includes the rotating shaft 221 formed on the round rod-shaped body and having bearing mounting surfaces 223 and the bearing fixing projection 222 formed on the outer peripheral surface thereof and the fixing grooves 224 and the screw threads 225 for fixing the phases of the front rotor 240 and the rear rotor 250, the bearings 226 selected from a grease supply cooling type bearing, an oil supply cooling type bearing, an air cooling type bearing, and a magnetic bearing, and the fixture 227 for fixing a phase.

As shown in FIGS. 1 and 4, each of the front rotor 240 and the rear rotor 250 includes: a rotary plate 242 having a cylindrical protruding portion 244 formed from the center of a disc-shaped body thereof, a slot 243 formed on the inner peripheral surface of the cylindrical protruding portion 244 to fix a phase, and permanent magnet insertion holes 245 formed equally spaced on a circumferential axis of the body with respect to the slot 243; and permanent magnets 246 inserted into the permanent magnet insertion holes 245 with respect to the slot 243 in such a manner where their N and S poles are alternately insertedly attached thereto.

In more detail, each of the front rotor 240 and the rear rotor 250 includes: the rotary plate 242 having the cylindrical protruding portion 244 formed from the center of the disc-shaped body thereof, the slot 243 formed on the inner peripheral surface of the cylindrical protruding portion 244 to fix the phase, and the 2n (hereinafter, n is an integer) permanent magnet insertion holes 245 formed equally spaced on the circumferential axis of the body with respect to the slot 243; and the 2n permanent magnets 246 inserted into the permanent magnet insertion holes 245 with respect to the slot 243 of the rotary plate 242 in such a manner where their N and S poles are alternately insertedly attached thereto.

As shown in FIGS. 1, 2 and 5, each driver module 230 is configured wherein permanent magnets 236 are insertedly attached to the permanent magnet insertion holes 213 of the frame 210 with respect to the reference point 211 of the frame 210 in such a manner where their N and S poles are alternately insertedly attached thereto or they are insertedly attached thereto with three-phase arrangements.

Otherwise, each driver module 230 includes: a fixing rod 232 having permanent magnet insertion holes 233 formed equally spaced in a circumferential direction of an axis of the cylindrical body thereof around the front rotor 240 and the rear rotor 250 with respect to a reference point 231 of the cylindrical body thereof and bolt holes 234 formed to fix the driver module 230 to the frame 210, so that the permanent magnets 236 are insertedly attached to the permanent magnet insertion holes 233 with respect to the reference point 231 in such a manner where their N and S poles are alternately insertedly attached thereto or they are insertedly attached thereto with three-phase arrangements.

In more detail, each driver module 230 includes the 2n (hereinafter, n is an integer greater than 2) or 3n permanent magnets 236 attached to the permanent magnet insertion holes 213 of the frame 210 with respect to the reference point 211 of the frame 210 in such a manner where their N and S poles are alternately insertedly attached thereto or they are insertedly attached thereto with three-phase arrangements. Otherwise, the driver module 230 includes the fixing rod 232 having the 2n or 3n permanent magnet insertion holes 233 formed equally spaced in the circumferential direction of the axis of the cylindrical body thereof around the front rotor 240 and the rear rotor 250 with respect to the reference point 231 of the fixing rod 232, so that the 2n or 3n permanent magnets 236 are insertedly attached to the 2n or 3n permanent magnet insertion holes 233 with respect to the reference point 231 in such a manner where their N and S poles are alternately insertedly attached thereto or they are insertedly attached thereto with three-phase arrangements.

As shown in FIGS. 1 and 6, the front driver module 310 includes a fixing rod 312 having a mounting surface 315 formed on a cylindrical body whose one surface is closed to mount the power applying driving body 110 and the power generator 200 thereon and permanent magnet insertion holes 313 formed equally spaced in a circumferential direction around the front rotor 240 with respect to a reference point 311, so that permanent magnets 316 are insertedly attached to the permanent magnet insertion holes 313 with respect to the reference point 311 in such a manner where their N and S poles are alternately insertedly attached thereto or they are insertedly attached thereto with three-phase arrangements. Further, the fixing rod 312 of the front driver module 310 may have a shape of a disc.

In more detail, the front driver module 310 includes the fixing rod 312 having the mounting surface 315 formed on the cylindrical body whose one surface is closed to mount the power applying driving body 110 and the power generator 200 and the 2n (hereinafter, n is an integer greater than 2) or 3n permanent magnet insertion holes 313 formed equally spaced in the circumferential direction around the front rotor 240 with respect to the reference point 311, so that 2n or 3n permanent magnets 316 are insertedly attached to the 2n or 3n permanent magnet insertion holes 313 with respect to the reference point 311 in such a manner where their N and S poles are alternately insertedly attached thereto or they are insertedly attached thereto with three-phase arrangements.

As shown in FIGS. 1 and 6, the rear driver module 350 includes a fixing rod 312 having a mounting surface 315 formed on a cylindrical body whose one surface is closed to mount the power applying driving body 110 and the power generator 200 thereon and permanent magnet insertion holes 313 formed equally spaced in a circumferential direction around the rear rotor 250 with respect to a reference point 311, so that permanent magnets 316 are insertedly attached thereto to the permanent magnet insertion holes 313 with respect to the reference point 311 in such a manner where their N and S poles are alternately insertedly attached thereto or they are insertedly attached thereto with three-phase arrangements. Further, the fixing rod 312 of the rear driver module 350 may have a shape of a disc.

In more detail, the rear driver module 350 includes the fixing rod 312 having the mounting surface 315 formed on the cylindrical body whose one surface is closed to mount the power applying driving body 110 and the power generator 200 and the 2n (hereinafter, n is an integer greater than 2) or 3n permanent magnet insertion holes 313 formed equally spaced in the circumferential direction around the rear rotor 250 with respect to the reference point 311, so that the 2n or 3n permanent magnets 316 are insertedly attached thereto to the 2n or 3n permanent magnet insertion holes 313 with respect to the reference point 311 in such a manner where their N and S poles are alternately insertedly attached thereto or they are insertedly attached thereto with three-phase arrangements.

As shown in FIG. 11, the magnetic fluxes of the front rotor 240 and the rear rotor 250 of the power generator 200 are produced in the axial direction of the frame 210, and the magnetic fluxes of the driver modules 230 of the power generator 200 and the magnetic fluxes of the front driver module 310 and the rear driver module 350 are produced in a perpendicular direction to those of the front rotor 240 and the rear rotor 250, while having a given gap therefrom.

In more detail, the magnetic fluxes of the front rotor 240 and the rear rotor 250 of the power generator 200 are produced in the axial direction of the frame 210, and the magnetic fluxes of the driver modules 230 of the power generator 200 and the magnetic fluxes of the front driver module 310 and the rear driver module 350 are produced in a perpendicular direction to those of the front rotor 240 and the rear rotor 250, while having a given gap from the front rotor 240 and the rear rotor 250 of the power generator 200.

Next, an explanation on the operations of the variable power transmission device 101 according to the first embodiment of the present invention will be given.

Under the above-mentioned configuration, the variable power transmission device 101 according to the first embodiment of the present invention produces a rotational force by an induced magnetic field generated from the front driver module 310, a rotating magnetic field generated from the power generator 200, and a rotating magnetic field generated from the power generator 200 together with the rear driver module 350, using the rotational power applied from the power applying driving body 110, increases the produced rotational force through acceleration, and transmits the increased rotational power to a power receiving object 120.

In more detail, the variable power transmission device 101 according to the present invention produces the rotational force by the induced magnetic field generated from the front driver module 310, the rotating magnetic field generated from the power generator 200, and the rotating magnetic field generated from the power generator 200 together with the rear driver module 350, using the rotational power applied from the power applying driving body 110, increases the produced rotational force through acceleration, and transmits the increased rotational power to the power receiving object 120.

In this case, the 2n (n is an integer) permanent magnets of the front rotor 240 and the rear rotor 250 of the power generator 200 are disposed on the circumferential axis of the frame 210 in such a manner as where their N and S poles are alternately arranged, and the 2n (n is an integer greater than 2) permanent magnets of the driver modules 230 of the power generator 200, the front driver module 310, and the rear driver module 350 are disposed in the circumferential direction of the frame 210 around the front rotor 240 and the rear rotor 250 in such a manner as where their N and S poles are alternately arranged. Otherwise, the 3n permanent magnets of the driver modules 230 of the power generator 200, the front driver module 310, and the rear driver module 350 are disposed in the circumferential direction of the frame 210 around the front rotor 240 and the rear rotor 250 in such a manner as where their N and S poles are disposed with three-phase arrangements.

As a result, the driver modules 230 of the power generator 200, the front driver module 310, and the rear driver module 350 face the front rotor 240 and the rear rotor 250 in the perpendicular direction thereto, while having the given gap therefrom, and thus, the magnetic fluxes of the permanent magnets of the front rotor 240 and the rear rotor 250 within the magnetic fields formed therearound produce virtual magnetic field rotation moment axes to cause attraction and repulsion forces between the permanent magnets of the front rotor 240 and the rear rotor 250 and the permanent magnets of the driver modules 230 of the power generator 200, the front driver module 310, and the rear driver module 350, thereby generating the rotational force.

If the rotating shaft of the power applying driving body 110 rotates, accordingly, the induced magnetic field is produced by the front rotor 240 of the power generator 200 to allow the front rotor 240 and the rear rotor 250 to rotate, and the front rotor 240 and the rear rotor 250 rotate with the attraction and repulsion forces to and from the driver modules 230 of the power generator 200. The rear rotor 250 rotates with the attraction and repulsion forces to and from the rear driver module 350, produces the rotational force, increases the rotational force through acceleration, and transmits the increased rotational power to the power receiving object 120.

The output of the power generator 200 is determined by the multiplication of the rotational moment and the number of rotations, and accordingly, the magnetic flux densities, the contact areas with the magnetic fields, the diameter pitches and the facing gaps with each other of the permanent magnets of the front rotor 240, the rear rotor 250 and the driver modules 230 of the power generator 200 and the permanent magnets of the front driver module 310 and the rear driver module 350 are adjusted to desirably determine a maximum rotational force. Of course, the rotational power supplied from the power applying driving body 110 is adjusted to control the maximum rotational force in real time.

Further, more desirably, an electric or electro-magnetic clutch is mounted on the power applying driving body 110 to adjust the gap between the front rotor 240 of the power generator 200 and the front driver module 310, thereby controlling the strength of the magnetic field or serving to connect or disconnect the magnetic field.

Also, the variable power transmission device 101 produces the rotational force through the attraction and repulsion forces between the permanent magnets and is thus driven with the rotational force, thereby achieving a small amount of driving loss, a high driving efficiency, extremely low noise, good durability, and no additional driving cost.

For example, as shown in FIG. 1, an electric air cooler 601, which includes the variable power transmission device 101 according to the first embodiment of the present invention, a low power motor 410, an expander 501, and an expander case 505, is mounted on a cold air blower, so that air is sucked to the expander case 505 by the expander 501 and expanded or accelerated to produce cold air, the flow rate of the cold air is increased, and the cold air is lowered to a given temperature or below to blow the cold air to a blower, thereby decreasing the amount of power consumed.

That is, the motor 410 is mounted on the power generator 200, the front driver module 310 on the rotating shaft of the motor 410, the rear driver module 350 on the power generator 200, the expander 501 on the rotating shaft of the power generator 200, and the expander case 505 on the power generator 200 or the rear driver module 350.

In this case, the front driver module 310 rotates with the rotational power of the low power motor 410 to produce the induced rotational force to the front rotor 240 of the power generator 200, thereby rotating the front rotor 240 and the rear rotor 250. The front rotor 240 and the rear rotor 250 rotate with the attraction and repulsion forces to and from the driver modules 230 of the power generator 200, and the rear rotor 250 rotates with the attraction and repulsion forces to and from the magnetic flux of the rear driver module 350, produces the rotational force, increases the rotational force through acceleration, and transmits the increased rotational power to the expander 501, so that the expander 501 is accelerated. At this time, the power supplied to the motor 410 is controlled to change the rotational force of the power generator 200, thereby controlling the rotational force.

For another example, as shown in FIG. 1, an electric air cooler 603 for an air conditioner, which includes the variable power transmission device 101 according to the first embodiment of the present invention, the low power motor 410, the expander 501, and the expander case 505, is mounted between a heat exchanger and a blower so that the cool air discharged from the heat exchanger is sucked to the expander case 505 by the expander 501 and expanded or accelerated to produce cold air, the cold air is lowered to raise the density thereof, and the flow rate of the cold air is increased, thereby decreasing the amount of power consumed.

That is, the motor 410 is mounted on the power generator 200, the front driver module 310 on the rotating shaft of the motor 410, the rear driver module 350 on the power generator 200, the expander 501 on the rotating shaft of the power generator 200, and the expander case 505 on the power generator 200 or the rear driver module 350.

In this case, the rotational force is produced by the rotational power of the low power motor 410 and then accelerated so that the power generator 200 transmits the power to the expander 501 to accelerate the expander 501. At this time, the power supplied to the motor 410 is controlled to change the rotational force of the power generator 200, thereby controlling the rotational force.

For yet another example, as shown in FIG. 7, an electric air accelerator 641 for a vacuum cleaner, which includes the variable power transmission device 101 according to the first embodiment of the present invention, a low power motor 410, an axial expander 502 sucking and expanding air, and an expander case 505, is mounted so that air is sucked to the expander case 505 by the axial expander 502 to make a vacuumed state and the sucked air is separated from dust and the like through a filter to discharge only the air, thereby decreasing the amount of power consumed.

That is, the motor 410 is mounted on the power generator 200, the front driver module 310 on the rotating shaft of the motor 410, the rear driver module 350 on the power generator 200, the axial expander 502 on the rotating shaft of the power generator 200, and the expander case 505 on the power generator 200 or the rear driver module 350.

In this case, the rotational force is produced by the rotational power of the low power motor 410 and then accelerated so that the power generator 200 transmits the power to the axial expander 502 to accelerate the axial expander 502. At this time, the power supplied to the motor 410 is controlled to change the rotational force of the power generator 200, thereby controlling the rotational force. Further, as shown in FIG. 1, the centrifugal expander 501 is more desirably applied to enhance the degree of vacuum and to use an amount of air over a large range.

For another example, as shown in FIG. 8, an electric air supplier 613 for a fuel cell vehicle, which includes the variable power transmission device 101 according to the first embodiment of the present invention, a low power motor 410, an impeller 521 and an impeller case 525, is mounted on an air filter and a fuel cell so that air is sucked to the impeller case 525 by the impeller 521 and is compressed or pressurized to raise the density thereof, and a boost pressure is thus produced, thereby supplying the amount of air over a large range to the fuel cell and decreasing the amount of power consumed.

That is, the motor 410 is mounted on the power generator 200, the front driver module 310 on the rotating shaft of the motor 410, the rear driver module 350 on the power generator 200, the impeller 521 on the rotating shaft of the power generator 200, and the impeller case 525 on the power generator 200 or the rear driver module 350.

In this case, the rotational force is produced by the rotational power of the low power motor 410 and then accelerated so that the power generator 200 transmits the power to the impeller 521 to accelerate the impeller 521. At this time, the power supplied to the motor 410 is controlled to change the rotational force of the power generator 200, thereby controlling the rotational force.

For another example, as shown in FIG. 1, an electric expanded air charger 605 for a naturally aspirated vehicle, which includes the variable power transmission device 101 according to the first embodiment of the present invention, the low power motor 410, the expander 501, and the expander case 505, is mounted between an air filter and an air suction pipe so that air is sucked to the expander case 505 by the expander 501 and is expanded or accelerated to produce cool air, and the cool air is lowered to raise the density thereof, thereby increasing the charging efficiency and the output and improving the acceleration performance.

That is, the motor 410 is mounted on the power generator 200, the front driver module 310 on the rotating shaft of the motor 410, the rear driver module 350 on the power generator 200, the expander 501 on the rotating shaft of the power generator 200, and the expander case 505 on the power generator 200 or the rear driver module 350.

In this case, the rotational force is produced by the rotational power of the low power motor 410 and then accelerated so that the power generator 200 transmits the power to the expander 501 to accelerate the expander 501. At this time, the power supplied to the motor 410 is controlled to change the rotational force of the power generator 200, thereby controlling the rotational force. In this case, of course, the moment of rotation caused by the air flow applied to the expander 501 in correspondence to a negative suction pressure or a suction pressure changed in accordance with the load of an internal combustion engine is added to the moment of rotation caused by the magnetic rotational forces of the front rotor 240 and the rear rotor 250 rotating at the same time through the moment of rotation.

For another example, as shown in FIG. 8, an electric air charger 611 for a supercharged vehicle, which includes the variable power transmission device 101 according to the first embodiment of the present invention, the low power motor 410, the impeller 521 and the impeller case 525, is mounted on an air filter and an intake pipe so that air is sucked to the impeller case 525 by the impeller 521 and compressed or pressurized to raise the density thereof, and a boost pressure is thus produced, thereby enhancing the charging efficiency and output, reducing the load of the internal combustion engine and spool up time, and improving the acceleration performance.

That is, the motor 410 is mounted on the power generator 200, the front driver module 310 on the rotating shaft of the motor 410, the rear driver module 350 on the power generator 200, the impeller 521 on the rotating shaft of the power generator 200, and the impeller case 525 on the rear driver module 350.

In this case, the rotational force is produced by the rotational power of the low power motor 410 and then accelerated so that the power generator 200 transmits the power to the impeller 521 to accelerate the impeller 521. At this time, the power supplied to the motor 410 is controlled to change the rotational force of the power generator 200, thereby controlling the rotational force. In this case, of course, the moment of rotation caused by the air flow applied to the impeller 521 in correspondence to a negative suction pressure or a suction pressure changed in accordance with the load of an internal combustion engine is added to the moment of rotation caused by the magnetic rotational forces of the front rotor 240 and the rear rotor 250 rotating at the same time through the moment of rotation.

For still another example, as shown in FIG. 9, an mechanical air charger 621 for a supercharged vehicle, which includes the variable power transmission device 101 according to the first embodiment of the present invention, an idle pulley 420, an impeller 521 and an impeller case 525, is mounted on a belt drive system of an internal combustion engine so that air is sucked to the impeller case 525 by the impeller 521 and is compressed or pressurized to raise the density thereof, and a boost pressure is thus produced, thereby enhancing the charging efficiency and output, improving the acceleration performance, and reducing the frictional force, noise, and the load of the internal combustion engine.

That is, a fixture on which the idle pulley 420 is mounted is mounted on the power generator 200, and the front driver module 310 on the idle pulley 420, the rear driver module 350 on the power generator 200, the impeller 521 on the rotating shaft of the power generator 200, and the impeller case 525 on the power generator 200 or the rear driver module 350.

In this case, the idle pulley 420 rotates with the rotational power of the internal combustion engine and the rotational force of the idle pulley 420 is then accelerated so that the power generator 200 transmits the power to the impeller 521 to accelerate the impeller 521. In this case, of course, the moment of rotation caused by the air flow applied to the impeller 521 in correspondence to a negative suction pressure or a suction pressure changed in accordance with the load of the internal combustion engine is added to the moment of rotation caused by the magnetic rotational forces of the front rotor 240 and the rear rotor 250 rotating at the same time through the moment of rotation.

For another example, as shown in FIG. 10, a mechanical expanded air charger 631 for a naturally aspirated vehicle, which includes the variable power transmission device 101 according to the first embodiment of the present invention, an idle pulley 420, an expander 501 and an expander case 505, is mounted on a belt drive system of an internal combustion engine so that air is sucked to the expander case 505 by the expander 501 and is expanded or accelerated to produces cold air, and the cold air is lowered in temperature to raise the density thereof, thereby enhancing the charging efficiency and output and improving the acceleration performance.

That is, a fixture on which the idle pulley 420 is mounted is mounted on the power generator 200, the front driver module 310 on the idle pulley 420, the rear driver module 350 on the power generator 200, the impeller 521 on the rotating shaft of the power generator 200, and the impeller case 525 on the power generator 200 or the rear driver module 350.

In this case, the idle pulley 420 rotates with the rotational power of the internal combustion engine and the rotational force of the idle pulley 420 is then accelerated so that the power generator 200 transmits the power to the expander 501 to accelerate the expander 501. In this case, of course, the moment of rotation caused by the air flow applied to the expander 501 in correspondence to a negative suction pressure or a suction pressure changed in accordance with the load of the internal combustion engine is added to the moment of rotation caused by the magnetic rotational forces of the front rotor 240 and the rear rotor 250 rotating at the same time through the moment of rotation.

For another example, as shown in FIG. 11, an electric motor 645, which includes the variable power transmission device 101 according to the first embodiment of the present invention and a low power motor 410, is mounted so that the number of rotations and the rotational force are increased by the power generator 200 and the increased rotational power is transmitted to a power receiving object.

That is, the low power motor 410 is mounted on the power generator 200, the front driver module 310 on the rotating shaft of the low power motor 410, and the rear driver module 350 on the power generator 200.

In this case, the front driver module 310 rotates with the rotational power of the low power motor 410 to produce the induced rotational force to the front rotor 240 of the power generator 200, thereby rotating the front rotor 240 and the rear rotor 250. The front rotor 240 and the rear rotor 250 rotate with the attraction and repulsion forces to and from the driver modules 230 of the power generator 200, and the rear rotor 250 rotates with the attraction and repulsion forces to and from the magnetic flux of the rear driver module 350, produces the rotational force, increases the rotational force through acceleration, raises the number of rotations and the rotational force, and accelerates the rotating shaft of the power generator 200. At this time, the power supplied to the motor 410 is controlled to change the rotational force of the power generator 200, thereby controlling the rotational force.

Mode for Invention

Now, an explanation on the parts and operations of a variable power transmission device 102 according to a second embodiment of the present invention will be given.

First, the parts of the variable power transmission device 102 will be explained.

As shown in FIGS. 12, 13, 14 and 20, the variable power transmission device 102 according to the second embodiment of the present invention includes a power generator 200, a front driver module 310 and a rear driver module 350 which are the same as in the first embodiment of the present invention and is disposed between a power applying driving body 110 and a power receiving driving body 120 in such a manner where the power generator 200 is mounted on the power applying driving body 110 and the power receiving driving body 120, the front driver module 310 on the rotating shaft of the power applying driving body 110, and the rear driver module 350 on the rotating shaft of the power receiving driving body 120.

In more detail, the variable power transmission device 102 according to the second embodiment of the present invention includes the power generator 200, the front driver module 310 and the rear driver module 350 which are the same as in the first embodiment of the present invention and is disposed between the power applying driving body 110 and the power receiving driving body 120 in such a manner where the power generator 200 is mounted on the power applying driving body 110 and the power receiving driving body 120, the front driver module 310 on the rotating shaft of the power applying driving body 110, and the rear driver module 350 on the rotating shaft of the power receiving driving body 120.

Next, an explanation on the operations of the variable power transmission device 102 according to the second embodiment of the present invention will be given.

Under the above-mentioned configuration, the variable power transmission device 102 according to the second embodiment of the present invention produces a rotational force by an induced magnetic field generated from the front driver module 310 and a rotating magnetic field generated from the power generator 200, using the rotational power applied from the power applying driving body 110, increases the rotational force through acceleration, and induces a rotating magnetic field to the rear driver module 350, so that the rear driver module 350 produces the rotational force and transmits the rotational power to the power receiving driving body 120.

In more detail, the variable power transmission device 102 according to the second embodiment of the present invention produces the rotational force by the induced magnetic field generated from the front driver module 310 and the rotating magnetic field generated from the power generator 200, through the power applied from the power applying driving body 110, increases the rotational force through acceleration, and induces the rotating magnetic field to the rear driver module 350, so that the rear driver module 350 produces the rotational force and transmits the rotational force to the power receiving driving body 120.

In this case, the 2n (n is an integer) permanent magnets of the front rotor 240 and the rear rotor 250 of the power generator 200 are disposed on the circumferential axis of the frame 210 in such a manner as where their N and S poles are alternately arranged, and the 2n (n is an integer greater than 2) permanent magnets of the driver modules 230 of the power generator 200, the front driver module 310, and the rear driver module 350 are disposed in the circumferential direction of the frame 210 around the front rotor 240 and the rear rotor 250 in such a manner as where their N and S poles are alternately arranged. Otherwise, the 3n permanent magnets of the driver modules 230 of the power generator 200, the front driver module 310, and the rear driver module 350 are disposed in the circumferential direction of the frame 210 around the front rotor 240 and the rear rotor 250 in such a manner as where their N and S poles are arranged with three-phase arrangements.

As a result, the driver modules 230 of the power generator 200, the front driver module 310, and the rear driver module 350 face the front rotor 240 and the rear rotor 250 in the perpendicular direction to the front rotor 240 and the rear rotor 250, while having the given gap therefrom, and thus, the magnetic fluxes of the permanent magnets of the front rotor 240 and the rear rotor 250 within the magnetic fields formed therearound produce virtual magnetic field rotation moment axes to cause attraction and repulsion forces between the permanent magnets of the front rotor 240 and the rear rotor 250 and the permanent magnets of the driver modules 230 of the power generator 200, the front driver module 310, and the rear driver module 350, thereby generating the rotational force.

If the rotating shaft of the power applying driving body 110 rotates, accordingly, the front driver module 310 produces the induced magnetic field by the front rotor 240 of the power generator 200 to allow the front rotor 240 and the rear rotor 250 to rotate, and the front rotor 240 and the rear rotor 250 rotate with the attraction and repulsion forces to and from the driver modules 230 of the power generator 200. The rear rotor 250 induces the rotating magnetic field to the rear driver module 350, and accordingly, the rear driver module 350 produces a rotational force, increases the rotational force through acceleration, and transmits the rotational force to the power receiving driving body 120.

For example, as shown in FIG. 12, an electric compression apparatus 651 for an electric compression machine compressing a refrigerant, which includes the variable power transmission device 102 according to the present invention, a low power motor 410, and a compressor 551, is mounted to compress a refrigerant, thereby reducing driving noise, heat generated, an amount of power consumed, and driving cost.

That is, the motor 410 is mounted on the power generator 200, the front driver module 310 on the rotating shaft of the motor 410, the rear driver module 350 on the rotating shaft of the compressor 551, and the compressor 551 on the power generator 200.

In this case, the front driver module 310 rotates with the rotational power of the low power motor 410 to produce the induced rotational power to the front rotor 240 of the power generator 200, thereby rotating the front rotor 240 and the rear rotor 250. The front rotor 240 and the rear rotor 250 rotate with the attraction and repulsion forces to and from the driver modules 230 of the power generator 200, and the rear rotor 250 induces the rotating magnetic field to the rear driver module 350. Accordingly, the rear driver module 350 produces a rotational force, increases the rotational force through acceleration, and transmits the rotational force to the rotating shaft of the compressor 551, so that the compressor 551 operates.

For another example, as shown in FIG. 12, a small electric generating apparatus 655 for a vehicle using external power consumption equipment by means of separate capacitors, which includes the variable power transmission device 102 according to the present invention, the low power motor 410, and a separate generator 555 is mounted in an arbitrary space in which air freely flows, so that power is produced to reduce the generation load of an internal combustion engine and the generation cost thereof.

That is, the motor 410 is mounted on the power generator 200, the front driver module 310 on the rotating shaft of the motor 410, the rear driver module 350 is mounted on the rotating shaft of the generator 555, and the generator 555 on the power generator 200.

In this case, the rotational force is produced by the rotational power of the low power motor 410 and then increased. As a result, the rear rotor 250 of the power generator 200 induces the rotating magnetic field to the rear driver module 350, and accordingly, the rear driver module 350 produces a rotational force and transmits the rotational force to the rotating shaft of the generator 555, so that the generator 555 operates.

For yet another example, as shown in FIG. 13, a small mechanical generating apparatus 665, which includes the variable power transmission device 102 according to the present invention, an idle pulley 420 and a generator 555, is mounted on a belt drive system of an internal combustion engine for a vehicle charging a separate capacitor through the driving by the internal combustion engine for generation, so that power is produced to reduce the generation load of the internal combustion engine and the generation cost thereof.

That is, a fixture on which the idle pulley 420 is mounted is mounted on the power generator 200, the front driver module 310 on the rotating shaft of the idle pulley 420, the rear driver module 350 on the rotating shaft of the generator 565, and the generator 565 on the power generator 200.

In this case, the idle pulley 420 rotates with the rotational power of the internal combustion engine for generation and the rotational power of the idle pulley 420 is then increased to raise the rotational force. As a result, the rear rotor 250 of the power generator 200 induces the rotating magnetic field to the rear driver module 350, and accordingly, the rear driver module 350 produces a rotational force and transmits the rotational force to the rotating shaft of the generator 565, so that the generator 565 operates.

For another example, as shown in FIG. 13, a small mechanical compression apparatus 661 for a belt drive mechanical compression machine compressing a refrigerant, which includes the variable power transmission device 102 according to the present invention, the idle pulley 420 and a compressor 561, is mounted on a belt drive system of an internal combustion engine of the compression machine, so that the refrigerant is compressed to reduce the frictional loss of the idle pulley 420, the driving noise, the load of the internal combustion engine, and the operating cost thereof.

That is, a fixture on which the idle pulley 420 is mounted is mounted on the power generator 200, the front driver module 310 on the rotating shaft of the idle pulley 420, the rear driver module 350 on the rotating shaft of the compressor 561, and the compressor 561 on the power generator 200.

In this case, the idle pulley 420 rotates with the rotational power of the internal combustion engine and the front driver module 310 connected with the idle pulley 420 rotates, thereby producing a rotational force and increasing the rotational force. As a result, the rear rotor 250 of the power generator 200 induces the rotating magnetic field to the rear driver module 350, and accordingly, the rear driver module 350 produces a rotational force and transmits the rotational force to the rotating shaft of the compressor 561, so that the compressor 561 operates.

For still another example, as shown in FIG. 14, a wind generation apparatus 675, which includes the variable power transmission device 102 according to the present invention, vanes 430 and a generator 575, is mounted so that power is produced to enhance the durability and to generate a large amount of high quality power, without any loss of frictional force.

That is, a fixture on which the vanes 430 are mounted is mounted on the power generator 200, the front driver module 310 on the rotating shaft of the vanes 430, the rear driver module 350 on the rotating shaft of the generator 575, and the generator 575 on the power generator 200.

In this case, the rotational force is produced by the rotational power of the vanes 430 driven with the wind force and then increased. As a result, the rear rotor 250 of the power generator 200 induces the rotating magnetic field to the rear driver module 350, and accordingly, the rear driver module 350 produces a rotational force and transmits the rotational force to the rotating shaft of the generator 575, so that the generator 575 operates.

Now, an explanation on the parts and operations of a variable power transmission device according to a third embodiment of the present invention will be given.

First, the parts of the variable power transmission device will be explained.

As shown in FIGS. 15, 16 and 20, the variable power transmission device 103 according to the third embodiment of the present invention includes a power generator 200, a front driver module 310 and a rear driver module 350 which are the same as in the first embodiment of the present invention and is disposed in such a manner where the power generator 200 is mounted on a power receiving driving body 120 to mount a rotary body of the power receiving driving body 120 thereon, and the front driver module 310 and the rear driver module 350 on the power generator 200.

In more detail, the variable power transmission device 103 according to the third embodiment of the present invention includes the power generator 200, the front driver module 310 and the rear driver module 350 which are the same as in the first embodiment of the present invention and is disposed in such a manner where the power generator 200 is mounted on the power receiving driving body 120 to mount the rotary body of the power receiving driving body 120 thereon, and the front driver module 310 and the rear driver module 350 on the power generator 200.

Next, an explanation on the operations of the variable power transmission device 103 according to the third embodiment of the present invention will be given.

Under the above-mentioned configuration, the variable power transmission device 103 according to the third embodiment of the present invention produces a rotational force from a rotating magnetic field produced by the power generator 200 and rotating magnetic fields produced by the front driver module 310 and the rear driver module 350, using the rotational power applied from the power receiving driving body 120, increases the rotational force, and transmits the rotational power to the power receiving driving body 120.

In more detail, the variable power transmission device 103 according to the third embodiment of the present invention produces the rotational force from the rotating magnetic field generated from the power generator 200 and the rotating magnetic fields generated from the front driver module 310 and the rear driver module 350, using the rotational power applied from the power receiving driving body 120, increases the rotational force, and transmits the rotational power to the power receiving driving body 120.

In this case, 2n (n is an integer) permanent magnets of the front rotor 240 and the rear rotor 250 of the power generator 200 are disposed on the circumferential axis of the frame 210 in such a manner as where their N and S poles are alternately arranged, and 2n (n is an integer greater than 2) permanent magnets of the driver modules 230 of the power generator 200, the front driver module 310, and the rear driver module 350 are disposed in the circumferential direction of the frame 210 around the front rotor 240 and the rear rotor 250 in such a manner as where their N and S poles are alternately arranged. Otherwise, 3n permanent magnets of the driver modules 230 of the power generator 200, the front driver module 310, and the rear driver module 350 are disposed in the circumferential direction of the frame 210 around the front rotor 240 and the rear rotor 250 in such a manner as where their N and S poles are arranged with three-phase arrangements.

As a result, the driver modules 230 of the power generator 200, the front driver module 310, and the rear driver module 350 face the front rotor 240 and the rear rotor 250 in the perpendicular direction to the front rotor 240 and the rear rotor 250, while having the given gap therefrom, and thus, the magnetic fluxes of the permanent magnets of the front rotor 240 and the rear rotor 250 within the magnetic fields formed therearound produce virtual magnetic field rotation moment axes to cause attraction and repulsion forces between the permanent magnets of the front rotor 240 and the rear rotor 250 and the permanent magnets of the driver modules 230 of the power generator 200, the front driver module 310, and the rear driver module 350, thereby generating the rotational force.

If the rotating shaft of the power receiving driving body 120 rotates with the rotational power received thereto, accordingly, the front rotor 240 and the rear rotor 250 of the power generator 200 rotate with the attraction and repulsion forces to and from the driver modules 230 of the power generator 200, the front driver module 310, and the rear driver module 350 to produce the rotational force with the rotating magnetic fields, and the rotational force is increased to transmit the rotational power to the power receiving driving body 120.

For example, as shown in FIG. 15, an air cooler 681 for a naturally aspirated vehicle, which includes the variable power transmission device 103 according to the present invention, an expander 501, and an expander case 505, is mounted between an air filter and an intake pipe of an internal combustion engine so that air is sucked to the expander case 505 by the expander 501 and is expanded or accelerated to produce cool air, and the cool air is lowered in temperature to raise the density thereof, thereby increasing the charging efficiency and improving the output.

That is, the front driver module 310 and the rear driver module 350 are mounted on the power generator 200, the expander 501 on the rotating shaft of the power generator 200, and the expander case 505 on the power generator 200 or the rear driver module 350.

In this case, the expander 501 and the front rotor 240 and the rear rotor 250 of the power generator 200 rotate with the power of air flow caused by a negative suction pressure or a suction pressure of the internal combustion engine, and the front rotor 240 and the rear rotor 250 of the power generator 200 rotate with the attraction and repulsion forces to and from the driver modules 230 of the power generator 200, the front driver module 310, and the rear driver module 350 to produce the rotational force with the rotating magnetic fields, and the rotational force is then increased to transmit the rotational power to the expander 501, so that the expander 501 is accelerated.

For another example, as shown in FIG. 15, an air cooler 683 for a supercharged vehicle having a turbocharger or supercharger, which includes the variable power transmission device 103 according to the present invention, an expander 501, and an expander case 505, is mounted between a cooling device and an intake pipe so that the compressed air discharged from the cooling device is sucked to the expander case 505 by the expander 401 and is expanded or accelerated to produce expanded or accelerated air, and next, the air is lowered in temperature to raise the density thereof, thereby increasing the charging efficiency.

That is, the front driver module 310 and the rear driver module 350 are mounted on the power generator 200, the expander 501 on the rotating shaft of the power generator 200, and the expander case 505 on the power generator 200 or the rear driver module 350.

In this case, the rotational force is produced by the power of air flow caused by the boost pressure of the internal combustion engine and is increased, so that the power generator 200 transmits the power to the expander 501 to accelerate the expander 501.

For yet example, as shown in FIG. 16, a fluid accelerator 685 for a fluid transferring apparatus, which includes the variable power transmission device 103 according to the present invention, an impeller 521, and an impeller case 525, is mounted between flow path pipes so that the flow rate and pressure of the fluid are increased to raise the amount of fluid discharged and a lift height.

That is, the front driver module 310 and the rear driver module 350 are mounted on the power generator 200, the impeller 521 on the rotating shaft of the power generator 200, and the impeller case 525 on the power generator 200 or the rear driver module 350.

In this case, the rotational force is produced by the power of transferring flow caused by the flow path pipes, which is supplied from a fluid pump, and is then increased, so that the power generator 200 transmits the power to the impeller 521 to accelerate the impeller 521.

Now, an explanation on the parts and operations of a variable power transmission device 104 according to a fourth embodiment of the present invention will be given.

First, the parts of the variable power transmission device 104 will be explained.

As shown in FIGS. 17 and 20, the variable power transmission device 104 according to the fourth embodiment of the present invention includes a front driver module 310 and a power generator 200 which are the same as in the first embodiment of the present invention and is disposed in such a manner where the power generator 200 is mounted on a power applying driving body 110 and the front driver module 310 on the rotating shaft of the power applying driving body 110.

In more detail, the variable power transmission device 104 according to the fourth embodiment of the present invention includes the front driver module 310 and the power generator 200 which are the same as in the first embodiment of the present invention and is disposed in such a manner where the power generator 200 is mounted on a power applying driving body 110 and the front driver module 310 on the rotating shaft of the power applying driving body 110.

Next, an explanation on the operations of the variable power transmission device 104 according to the fourth embodiment of the present invention will be given.

Under the above-mentioned configuration, the variable power transmission device 104 according to the fourth embodiment of the present invention produces a rotational force by an induced magnetic field generated from the front driver module 310 and a rotating magnetic field generated from the power generator 200, using the rotational power applied from the power applying driving body 110, increases the rotational force through acceleration, and transmits the power to a power receiving object 120.

In more detail, the variable power transmission device 104 according to the fourth embodiment of the present invention produces the rotational force from an induced magnetic field generated from the front driver module 310 and the rotating magnetic field generated from the power generator 200, using the rotational power applied from the power applying driving body 110, increases the rotational force through acceleration, and transmits the power to the power receiving object 120.

In this case, 2n (n is an integer) permanent magnets of the front rotor 240 and the rear rotor 250 of the power generator 200 are disposed on the circumferential axis of the frame 210 in such a manner as where their N and S poles are alternately arranged, and 2n (n is an integer greater than 2) permanent magnets of the driver modules 230 of the power generator 200 and the front driver module 310 are disposed in the circumferential direction of the frame 210 around the front rotor 240 and the rear rotor 250 in such a manner as where their N and S poles are alternately arranged. Otherwise, 3n permanent magnets of the driver modules 230 of the power generator 200 and the front driver module 310 are disposed in the circumferential direction of the frame 210 around the front rotor 240 and the rear rotor 250 in such a manner as where their N and S poles are arranged with three-phase arrangements.

As a result, the front driver module 310 and the driver modules 230 of the power generator 200 face the front rotor 240 and the rear rotor 250 in the perpendicular direction to the front rotor 240 and the rear rotor 250, while having the given gap therefrom, and thus, the magnetic fluxes of the permanent magnets of the front rotor 240 and the rear rotor 250 within the magnetic fields formed therearound produce virtual magnetic field rotation moment axes to cause attraction and repulsion forces between the permanent magnets of the front rotor 240 and the rear rotor 250 and the permanent magnets of the driver modules 230 of the power generator 200, thereby generating the rotational force.

If the rotating shaft of the power applying driving body 110 rotates, accordingly, the front driver module 310 produces the induced magnetic field from the front rotor 240 of the power generator 200, and the front rotor 240 of the power generator 200 rotates with the rotating magnetic field so that the front rotor 240 and the rear rotor 250 produce the rotational force with the attraction and repulsion forces to and from the driver modules 230 of the power generator 200, increases the rotational force through acceleration, and transmits the power to the power receiving object 120.

For example, as shown in FIG. 17, the variable power transmission device 104 according to the fourth embodiment of the present invention is applied to the electric air cooler 601 for the cold air blower, the electric air cooler 603 of the air conditioner, the electric air accelerator 641 for the vacuum cleaner, the electric air supplier 613 for the fuel cell vehicle, the electric expanded air charger 605 and the mechanical expanded air charger 631 for the naturally aspirated vehicle, and the electric air charger 611 and the mechanical air charger 621 for the supercharged vehicle, which are suggested as the application examples in the first embodiment of the present invention.

Now, an explanation on the parts and operations of a variable power transmission device 105 according to a fifth embodiment of the present invention will be given.

First, the parts of the variable power transmission device 105 will be explained.

As shown in FIGS. 18 and 20, the variable power transmission device 105 according to the fifth embodiment of the present invention includes a rear driver module 350 and a power generator 200 which are the same as in the first embodiment of the present invention and is disposed in such a manner where the power generator 200 is mounted on a power receiving driving body 120 to mount a rotary body of the power receiving driving body 120 and the rear driver module 350 on the power generator 200.

In more detail, the variable power transmission device 105 according to the fifth embodiment of the present invention includes the rear driver module 350 and the power generator 200 which are the same as in the first embodiment of the present invention and is disposed in such a manner where the power generator 200 is mounted on the power receiving driving body 120 to mount the rotary body of the power receiving driving body 120 and the rear driver module 350 on the power generator 200.

Next, an explanation on the operations of the variable power transmission device 105 according to the fifth embodiment of the present invention will be given.

Under the above-mentioned configuration, the variable power transmission device 105 according to the fifth embodiment of the present invention produces a rotational force from a rotating magnetic field generated from the power generator 200 and a rotating magnetic field generated from the power generation 200 together with the rear driver module 350, using the rotational power supplied from the power receiving driving body 120, and the rotational force is increased and transmitted to the power receiving driving body 120.

In more detail, the variable power transmission device 105 according to the fifth embodiment of the present invention produces the rotational force from the rotating magnetic field generated from the power generator 200 and the rotating magnetic field generated from the power generation 200 together with the rear driver module 350, using the rotational power supplied from the power receiving driving body 120, and the rotational force is increased and transmitted to the power receiving driving body 120.

In this case, 2n (n is an integer) permanent magnets of the front rotor 240 and the rear rotor 250 of the power generator 200 are disposed on the circumferential axis of the frame 210 in such a manner as where their N and S poles are alternately arranged, and 2n (n is an integer greater than 2) permanent magnets of the driver modules 230 of the power generator 200 and the rear driver module 350 are disposed in the circumferential direction of the frame 210 around the front rotor 240 and the rear rotor 250 in such a manner as where their N and S poles are alternately arranged. Otherwise, 3n permanent magnets of the driver modules 230 of the power generator 200 and the rear driver module 350 are disposed in the circumferential direction of the frame 210 around the front rotor 240 and the rear rotor 250 in such a manner as where their N and S poles are arranged with three-phase arrangements.

As a result, the driver modules 230 of the power generator 200 and the rear driver module 350 face the front rotor 240 and the rear rotor 250 in the perpendicular direction to the front rotor 240 and the rear rotor 250, while having the given gap therefrom, and thus, the magnetic fluxes of the permanent magnets of the front rotor 240 and the rear rotor 250 within the magnetic fields formed therearound produce virtual magnetic field rotation moment axes to cause attraction and repulsion forces between the permanent magnets of the front rotor 240 and the rear rotor 250 and the permanent magnets of the driver modules 230 of the power generator 200 and the rear driver module 350, thereby generating a rotational force.

If the rotating shaft of the power receiving driving body 120 rotates with the rotational power received thereto, accordingly, the front rotor 240 of the power generator 200 rotates with the rotating magnetic field so that the front rotor 240 and the rear rotor 250 produce the rotational force with the attraction and repulsion forces to and from the driver modules 230 of the power generator 200, increases the rotational force, and transmits the rotational power and the power of the rotating magnetic fields to the power receiving driving body 120.

For example, as shown in FIG. 18, the air cooler 681 for a naturally aspirated vehicle, as the application example in the third embodiment of the present invention, which includes the variable power transmission device 105 according to the present invention, an expander 501, an expander case 505 and a generator 595, is mounted between an air filter and an air suction pipe of an internal combustion engine, so that air is sucked to the expander case 505 by the expander 501 and is expanded or accelerated to produce cool air, and the cool air is lowered in temperature to raise the density thereof, thereby conducting the generation with a high charging efficiency.

That is, the rear driver module 350 is mounted on the power generator 200, the expander 501 on the rotating shaft of the power generator 200, and the expander case 505 on the power generator 200 or the rear driver module 350.

In this case, the expander 501 and the front rotor 240 and the rear rotor 250 of the power generator 200 rotate with the power of air flow caused by a negative suction pressure or a suction pressure of the internal combustion engine, and the front rotor 240 and the rear rotor 250 of the power generator 200 rotate with the attraction and repulsion forces to and from the magnetic fluxes of the driver modules 230 of the power generator 200, the front driver module 310, and the rear driver module 350 to produce the rotational force with the rotating magnetic fields, to increase the rotational force, and to transmit the rotational power to the expander 501, so that the expander 501 is accelerated to expand or accelerate the sucked air, and further, the front rotor 240 and the rear rotor 250 of the power generator 200 transmit the power of the rotating magnetic fields to the generator 595, thereby producing power to be usefully used.

For another example, as shown in FIG. 18, the air cooler 683 for a supercharged vehicle having a turbocharger or supercharger, as the application example in the third embodiment of the present invention, which has the variable power transmission device 105 according to the present invention, an expander 501, an expander case 505 and a generator 595, is mounted between a cooling device and an air suction pipe so that the compressed air discharged from the cooling device is sucked to the expander case 505 by the expander 501 and is expanded or accelerated to produce expanded or accelerated air, and the air is lowered in temperature to raise the density thereof, thereby conducting the generation with a high charging efficiency.

That is, the rear driver module 350 is mounted on the power generator 200, the expander 501 on the rotating shaft of the power generator 200, and the expander case 505 on the power generator 200 or the rear driver module 350.

In this case, the rotational force is produced by the power of air flow caused by the boost pressure of the internal combustion engine and is increased to allow the power generator 200 to transmit the power to the expander 501 so that the expander 501 is accelerated to expand or accelerate the sucked air, and further, the power generator 200 transmits the power of the rotating magnetic fields to the generator 595, thereby producing power to be usefully used.

Now, an explanation on the parts and operations of a variable power transmission device 106 according to a sixth embodiment of the present invention will be given.

First, the parts of the variable power transmission device 106 will be explained.

As shown in FIGS. 19 and 20, the variable power transmission device 106 according to the sixth embodiment of the present invention includes a power generator 200 which is the same as in the first embodiment of the present invention and is disposed in such a manner where the power generator 200 is mounted on a power applying driving body 110.

In more detail, the variable power transmission device 106 according to the sixth embodiment of the present invention includes the power generator 200 which is the same as in the first embodiment of the present invention and is disposed in such a manner where the power generator 200 is mounted on the power applying driving body 110.

Next, an explanation on the operations of the variable power transmission device 106 according to the sixth embodiment of the present invention will be given.

Under the above-mentioned configuration, the variable power transmission device 106 according to the sixth embodiment of the present invention produces a rotational force from a rotating magnetic field generated from the power generator 200, using the power of the induced magnetic field supplied from the power applying driving body 110, increases the rotational force through acceleration, and transmits the rotational power to a power receiving object 120.

In more detail, the variable power transmission device 106 according to the sixth embodiment of the present invention produces the rotational force with the rotating magnetic force generated from the power generator, using the power of the induced magnetic field supplied from the power applying driving body 110, increases the rotational force through acceleration, and transmits the rotational power to the power receiving object 120.

In this case, 2n (n is an integer) permanent magnets of the front rotor 240 and the rear rotor 250 of the power generator 200 are disposed on the circumferential axis of the frame 210 in such a manner as where their N and S poles are alternately arranged, and 2n (n is an integer greater than 2) permanent magnets of the driver modules 230 of the power generator 200 are disposed in the circumferential direction of the frame 210 around the front rotor 240 and the rear rotor 250 in such a manner as where their N and S poles are alternately arranged. Otherwise, 3n permanent magnets of the driver modules 230 of the power generator 200 are disposed in the circumferential direction of the frame 210 around the front rotor 240 and the rear rotor 250 in such a manner as where their N and S poles are arranged with three-phase arrangements.

As a result, the driver modules 230 of the power generator 200 face the front rotor 240 and the rear rotor 250 in the perpendicular direction to the front rotor 240 and the rear rotor 250, while having the given gap therefrom, and thus, the magnetic fluxes of the permanent magnets of the front rotor 240 and the rear rotor 250 within the magnetic fields formed therearound produce virtual magnetic field rotation moment axes to cause attraction and repulsion forces between the permanent magnets of the front rotor 240 and the rear rotor 250 and the permanent magnets of the driver modules 230 of the power generator 200, thereby generating a rotational force.

If the power applying driving body 110 produces the induced magnetic field, accordingly, the front rotor 240 of the power generator 200 rotates with the rotating magnetic field so that the front rotor 240 and the rear rotor 250 produce the rotational force with the attraction and repulsion forces to and from the driver modules 230 of the power generator 200, increase the rotational force through acceleration, and transmit the power to the power receiving object 120.

For example, as shown in FIG. 19, the variable power transmission device 106 according to the sixth embodiment of the present invention and a magnetic field generator 450, instead of the electric motor, are applied to the electric air cooler 601 for the cold air blower, the electric air cooler 603 for the air conditioner, the electric air accelerator 641 for the vacuum cleaner, the electric air supplier 613 for the fuel cell vehicle, the electric expanded air charger 605 for the naturally aspirated vehicle, and the electric air charger 611 for the supercharged vehicle, which are suggested as the application examples in the first embodiment of the present invention.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A variable power transmission device, comprising:
a frame including;
   a body; and
   driver modules secured to the body, each of the driver modules having 2n permanent magnets that have N and S poles alternately arranged or having 3n permanent magnets that have N and S poles in a three-phase arrangement along a circumferential direction of the body;
a bearing module having a rotating shaft and disposed in a central portion of and inside of the body of the frame;
front and rear rotors coupled to the rotating shaft of the bearing module, disposed on front and rear sides of the frame, respectively, and spaced apart from each other along a coaxial direction of front and rear surfaces of the frame, each of the front and rear rotors having a disc-shaped body and 2n permanent magnets that have N and S poles alternately arranged and are equally spaced apart from each other and arranged along a circumferential direction; and
a driving body coupled to the rotating shaft of the bearing module and configured to apply a rotating power to the rotating shaft of the bearing,
wherein the front and rear rotors rotate in response to a rotation of the driving body, wherein rotating magnetic fields are generated by the permanent magnets of the front and rear rotors when the front and rear rotors rotate, wherein rotational forces to rotate the front and rear rotors are produced by interactions between the rotating magnetic fields and permanent magnets of the driver modules of the frame, and wherein n is an integer greater than 1.

2. The variable power transmission device of claim 1, further comprising:
at least one of front and rear driver modules, the front driver module being spaced apart from the front rotor and coupled to the frame and having permanent magnets arranged along a circumferential direction of the front rotor, the rear driver module being spaced apart from the rear rotor and coupled to the frame and having permanent magnets arranged along a circumferential direction of the rear rotor.

3. The variable power transmission device of claim 1, further comprising:
at least one of front and rear driver modules, the front driver module being spaced apart from the front rotor and coupled to the frame, the rear driver module being spaced apart from the front rotor and coupled to a generator for generating electrical power.

4. The variable power transmission device of claim 1, further comprising:
at least one of front and rear driver modules, each of the front and rear driver modules being spaced apart from the front and rear rotors and coupled to the frame and coupled to a magnetic generator for generating magnetic fluxes.

5. A variable power transmission device, comprising:
a frame, including;
   a body; and
   driver modules secured to the body and each having 2n permanent magnets that have N and S poles alternately arranged or having 3n permanent magnets that have N and S poles in a three-phase arrangement along a circumferential direction of the body;
a bearing module having a rotating shaft and mounted in a central portion of and inside of the body of the frame;
a first driving body for supplying rotational power;
a second driving body for receiving rotational power;
front and rear rotors coupled to the rotating shaft of the bearing module, disposed on front and rear sides of the frame, respectively, and spaced apart from each other along a coaxial direction of front and rear surfaces of the frame, each of the front and rear rotors having a disc-shaped body and 2n permanent magnets that have N and S poles alternately arranged and are equally spaced apart from each other and arranged along a circumferential direction; and
front and rear driver modules, the front driver module being disposed on a front side of the front rotor and spaced apart from the front rotor, the rear driver module being disposed on a rear side of the rear rotor and spaced apart from the rear rotor, each of the front and rear driver modules having 2n permanent magnets that have N and S poles alternately arranged and are disposed to face the permanent magnets of driver modules of the frame or having 3n permanent magnets that have N and S poles in a three-phase arrangement and are disposed to face the permanent magnets of the driver modules of the frame;
wherein the front driver module is coupled to the first driving body and rotates using rotational power supplied by the first driving body, wherein a first rotating magnetic field is generated by the permanent magnets of the front driver module when the front driver module rotates, wherein a rotational force to rotate the front rotor is produced by an interaction between the first rotating magnetic field and permanent magnets of the front rotor,
wherein a second rotating magnetic field is generated by the permanent magnets of the front rotor when the front rotor rotates, wherein an additional rotational force to rotate the front rotor is produced by an interaction between the permanent magnets of the driver modules of the frame and the second rotating magnetic field;
wherein the rear rotor coupled to the rotating shaft of the bearing module rotates when the front rotor rotates, a third rotating magnetic field is generated by the permanent magnets of the rear rotor when the rear rotor rotates, wherein an additional rotational force to rotate the rear rotor is produced by an interaction between the third rotating magnetic field and permanent magnets of the rear driver module and the permanent magnets of the driver modules of the frame, and wherein n is an integer greater than 1.

6. The variable power transmission device of claim 5, wherein the second driving body for receiving rotating power is coupled to the rotating shaft of the bearing module.

7. The variable power transmission device of claim 5, wherein the rear driver module is coupled to a rotating shaft of the second driving body for receiving rotating power.

8. The variable power transmission device of claim 5, wherein the rotating shaft of the bearing module has a circular rod-shaped body and wherein bearing mounting surfaces, a bearing fixing projection, fixing grooves for fixing phases of the front and rear rotors, and screw threads are formed on an outer surface of the circular rod-shaped body, and
wherein the bearing module further comprises:
   a bearing selected from a grease supply cooling type bearing, an oil supply cooling type bearing, an air cooling type bearing, and a magnetic bearing; and
   a fixture for fixing phases of the front and rear rotors.

9. The variable power transmission device of claim 5, wherein each of the front and rear rotors comprises:
- a rotary plate having a circular disc shape;
- a cylindrical protruding portion extending from a central portion of the rotary plate;
- a slot formed on an inner peripheral surface of the cylindrical protruding portion and configured to fix a phase;
- 2n permanent magnet insertion holes equally spaced apart and arranged along a circumferential direction of the rotary plate; and
- 2n permanent magnets inserted into the permanent magnet insertion holes and having N and S poles alternately arranged.

10. The variable power transmission device of claim 5, wherein each of the driver modules of the frame comprises:
- a fixing rod having permanent magnet insertion holes equally spaced apart and arranged along a circumferential direction of the front rotor,
- wherein the 2n or 3n permanent magnets are inserted into the permanent magnet insertion holes.

11. The variable power transmission device of claim 5, wherein the front driver module comprises:
- a fixing rod including a cylindrical body whose top surface is closed, a surface for mounting the first driving body for supplying rotating power thereon, and permanent magnet insertion holes equally spaced apart and arranged along a circumferential direction of the front rotor,
- wherein the 2n or 3n permanent magnets are inserted into the permanent magnet insertion holes.

12. The variable power transmission device of claim 5, wherein the rear driver module comprises:
- a fixing rod including a cylindrical body whose top surface is closed, a surface for mounting the second driving body for receiving rotating power thereon, and permanent magnet insertion holes equally spaced apart and arranged along a circumferential direction of the rear rotor,
- wherein the 2n or 3n permanent magnets are inserted into the permanent magnet insertion holes of the fixing rod.

* * * * *